(12) United States Patent
Kim et al.

(10) Patent No.: US 11,792,563 B2
(45) Date of Patent: Oct. 17, 2023

(54) ELECTRONIC DEVICE INCLUDING SPEAKER UNIT

(71) Applicant: Samsung Electronics Co., Ltd., Suwon-si (KR)

(72) Inventors: Jinkyun Kim, Suwon-si (KR); Heejun Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 17/528,958

(22) Filed: Nov. 17, 2021

(65) Prior Publication Data

US 2022/0167079 A1 May 26, 2022

Related U.S. Application Data

(63) Continuation of application No. PCT/KR2021/015442, filed on Oct. 29, 2021.

(30) Foreign Application Priority Data

Nov. 20, 2020 (KR) .................. 10-2020-0156410

(51) Int. Cl.
*H04R 1/28* (2006.01)
*H04R 1/24* (2006.01)

(52) U.S. Cl.
CPC ............. *H04R 1/2811* (2013.01); *H04R 1/24* (2013.01); *H04R 2499/11* (2013.01)

(58) Field of Classification Search
CPC ........ G06F 1/16; G06F 1/1628; G06F 1/1656; G06F 1/1688; H04R 1/2811; H04R 1/24; H04R 2499/11; H04R 1/28; H04R 1/2888
See application file for complete search history.

(56) References Cited

U.S. PATENT DOCUMENTS

| 7,069,061 B2 | 6/2006 | Gammon et al. |
| 7,933,637 B2 | 4/2011 | Gammon et al. |

(Continued)

FOREIGN PATENT DOCUMENTS

| CN | 106101955 A | 11/2016 |
| CN | 106162459 A | 11/2016 |

(Continued)

OTHER PUBLICATIONS

International Search Report dated Feb. 21, 2022, issued in International Application No. PCT/KR2021/015442.

*Primary Examiner* — Brian Ensey
(74) *Attorney, Agent, or Firm* — Jefferson IP Law, LLP

(57) ABSTRACT

An electronic device is provided. The electronic device includes a front plate, a back plate that faces away from the front plate, a side member including a frame structure that surrounds an inner space between the front plate and the back plate and a plate structure extending from the frame structure into the inner space, a display disposed between the plate structure and the front plate, a first speaker unit disposed in the inner space, at least part of the first speaker unit being supported by the plate structure, a first metal plate disposed between the plate structure and the display, and a sealing member that is disposed between the first metal plate and the display and that has a first opening portion formed on a side thereof. A first chamber is formed between the first speaker unit and the first metal plate, and a second chamber surrounded by the sealing member is formed between the first metal plate and the display. The second chamber and the first chamber are fluidly connected with each other by the first opening portion such that a first resonator structure corresponding to the first speaker unit is formed between the display and the plate structure.

20 Claims, 19 Drawing Sheets

(56) References Cited

U.S. PATENT DOCUMENTS

| | | | |
|---|---|---|---|
| 9,119,001 B2 | 8/2015 | Yeh | |
| 10,219,058 B2 | 2/2019 | Tung et al. | |
| 10,701,469 B2 | 6/2020 | Park et al. | |
| 10,979,794 B2 | 4/2021 | Park et al. | |
| 11,379,022 B2 * | 7/2022 | Park | H04B 1/3827 |
| 2005/0014537 A1 | 1/2005 | Gammon et al. | |
| 2006/0194618 A1 | 8/2006 | Gammon et al. | |
| 2014/0177902 A1 * | 6/2014 | Yeh | H04R 1/227 |
| | | | 381/394 |
| 2014/0369533 A1 | 12/2014 | Kim et al. | |
| 2019/0037294 A1 | 1/2019 | Hung et al. | |
| 2021/0235176 A1 | 7/2021 | Park et al. | |

FOREIGN PATENT DOCUMENTS

| | | |
|---|---|---|
| CN | 109327566 A | 2/2019 |
| JP | 2014-123946 A | 7/2014 |
| JP | 2015-126437 A | 7/2015 |
| KR | 10-2007-0044194 A | 4/2007 |
| KR | 10-2014-0145068 A | 12/2014 |
| KR | 10-2017-0006075 A | 1/2017 |
| KR | 10-2018-0051983 A | 5/2018 |
| WO | 2005/009008 A1 | 1/2005 |
| WO | 2022/030935 A1 | 2/2022 |

* cited by examiner

ELECTRONIC DEVICE INCLUDING SPEAKER UNIT

CROSS-REFERENCE TO RELATED APPLICATION(S)

This application is a continuation application, claiming priority under § 365(c), of an International application No. PCT/KR2021/015442, filed on Oct. 29, 2021, which is based on and claims the benefit of a Korean patent application number 10-2020-0156410, filed on Nov. 20, 2020, in the Korean Intellectual Property Office, the disclosure of which is incorporated by reference herein in its entirety.

TECHNICAL FIELD

The disclosure relates to an electronic device including a speaker unit.

BACKGROUND ART

An electronic device may include at least one speaker unit. The electronic device may output a sound to the outside through the speaker unit. For example, the speaker unit may be configured to convert an electrical signal into an audio signal. For example, the speaker unit may generate and deliver the audio signal by vibrating air based on the electrical signal. The electronic device may include a structure for supporting the speaker unit. For example, the speaker unit may be disposed as a single component inside the electronic device, or may be disposed inside the electronic device in a state of being accommodated in a speaker enclosure.

The above information is presented as background information only to assist with an understanding of the disclosure. No determination has been made, and no assertion is made, as to whether any of the above might be applicable as prior art with regard to the disclosure.

DISCLOSURE

Technical Problem

A speaker system disposed in an electronic device may include a front radiation speaker system and a side radiation speaker system. Due to a long sound output path and a large front volume, the side radiation speaker system may have relatively poor acoustic performance, compared to the front radiation speaker system. Based on this issue, a resonator structure may be applied to complement the acoustic performance of the side radiation speaker system. When a resonator is directly located on a mechanical side surface of a support structure or a speaker enclosure structure of the electronic device, there may be difficulties in cost and design change due to modification of a mold.

Aspects of the disclosure are to address at least the above-mentioned problems and/or disadvantages and to provide at least the advantages described below. Accordingly, an aspect of the disclosure is to provide an electronic device for implementing a resonator structure of a speaker unit using a part of structures of the electronic device that support the speaker unit and/or a part of structures of a speaker enclosure.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a front plate, a back plate that faces away from the front plate, a side member including a frame structure that surrounds an inner space between the front plate and the back plate and a plate structure extending from the frame structure toward the inner space, a display disposed between the plate structure and the front plate, a first speaker unit disposed in the inner space, at least part of the first speaker unit being supported by the plate structure, a first metal plate disposed between the plate structure and the display, and a sealing member that is disposed between the first metal plate and the display and that has a first opening portion formed on a side thereof. A first chamber is formed between the first speaker unit and the first metal plate, and a second chamber surrounded by the sealing member is formed between the first metal plate and the display. The second chamber and the first chamber are fluidly connected with each other by the first opening portion such that a first resonator structure corresponding to the first speaker unit is formed between the display and the plate structure.

In accordance with another aspect of the disclosure, a speaker assembly is provided. The speaker assembly includes a speaker enclosure having a predetermined receiving space formed therein and a speaker unit, at least part of which is accommodated in the receiving space of the speaker enclosure. The speaker enclosure includes a first case that supports the speaker unit, a second case coupled to the first case to form the receiving space, and a metal plate disposed on the second case. The second case includes an extending portion disposed between part of the metal plate and part of the speaker unit and a protruding portion on which the metal plate is seated, the protruding portion having an opening portion formed on a side thereof. A first separation space is formed between the extending portion and the speaker unit, and a second separation space surrounded by part of the protruding portion is formed between the extending portion and the metal plate. The second separation space and the first separation space are fluidly connected with each other by the opening portion such that a resonator structure corresponding to the speaker unit is formed in the speaker enclosure.

Advantageous Effects

The electronic device according to the various embodiments of the disclosure may include the resonator structure formed in the front space of the speaker unit, thereby improving the acoustic performance of the speaker unit.

Furthermore, the electronic device according to the various embodiments of the disclosure may include the resonator structure formed by using some of the components supporting the speaker unit, and thus resonator design and tuning may be easily performed.

Moreover, the electronic device according to the various embodiments of the disclosure may facilitate design of a resonator having a desired specification through a change in the size and/or shape of a sealing member and/or a bonding member.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR DISCLOSURE

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
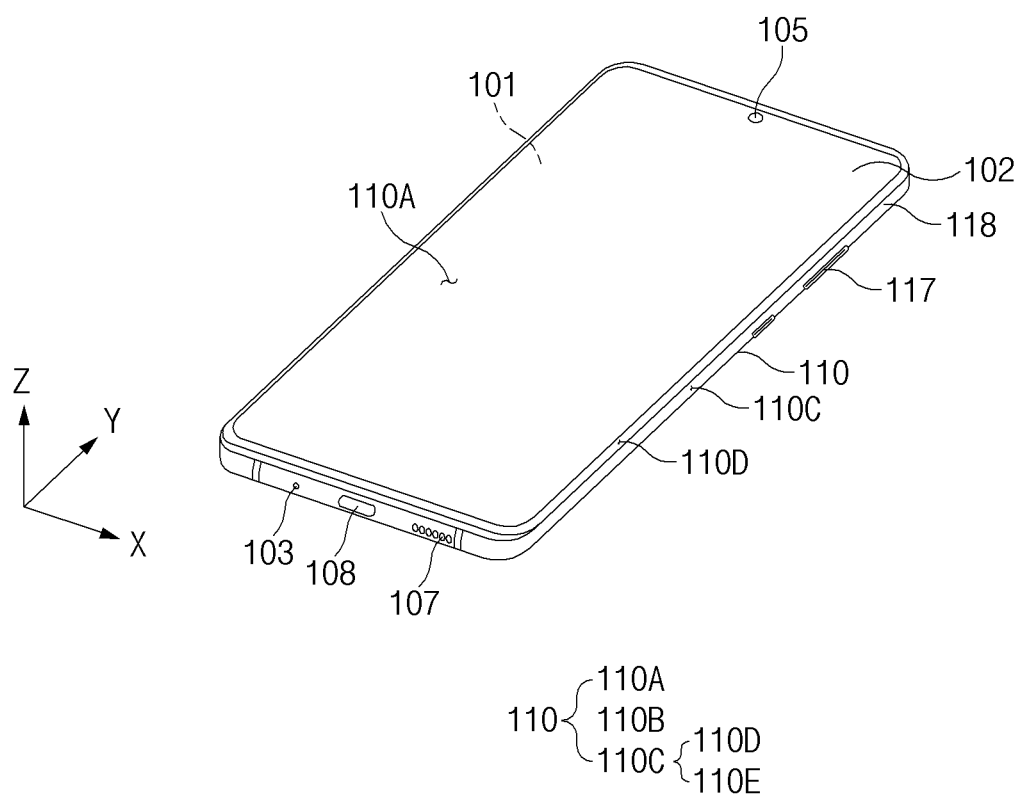
FIG. 1 is a front perspective view of an electronic device according to an embodiment of the disclosure.
Figure 2:
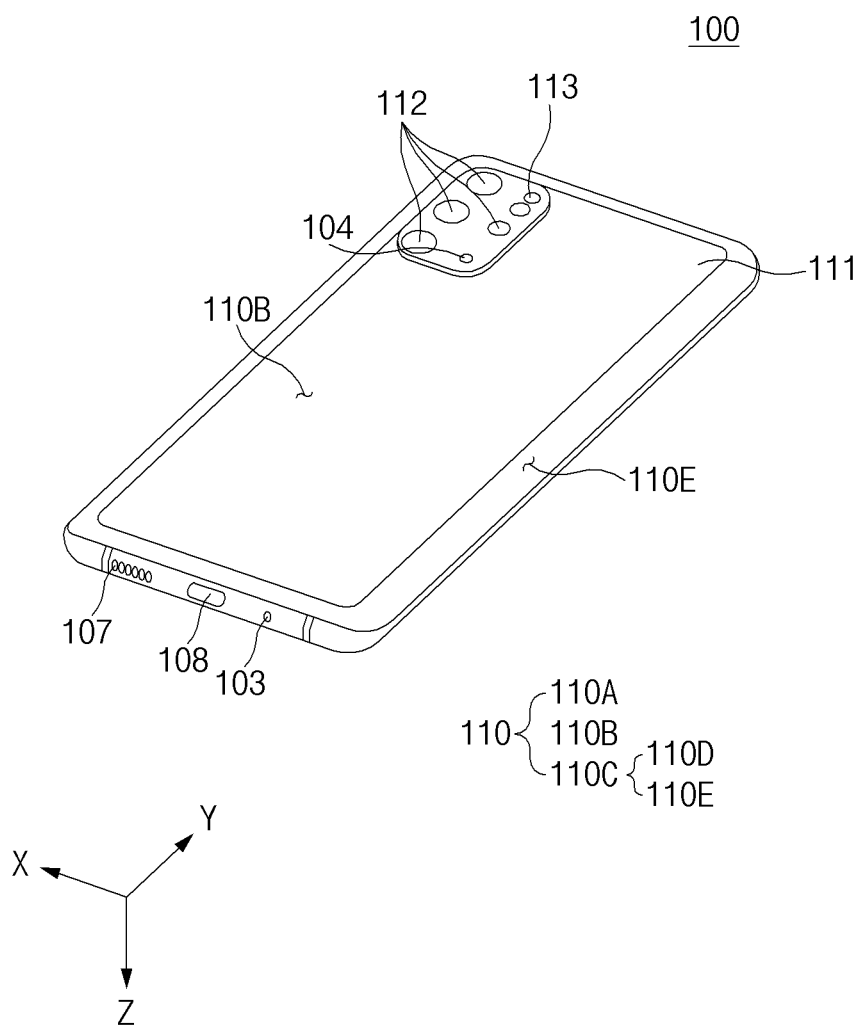
FIG. 2 is a rear perspective view of an electronic device according to an embodiment of the disclosure.

FIG. 1 is a front perspective view of an electronic device according to an embodiment of the disclosure. FIG. 2 is a rear perspective view of an electronic device according to an embodiment of the disclosure.

Referring to FIGS. 1 and 2, the electronic device 100 according to the embodiment may include a housing 110 that includes a first surface (or, a front surface) 110A, a second surface (or, a rear surface) 110B, and a third surface (or, a side surface) 110C surrounding a space between the first surface 110A and the second surface 110B.

In another embodiment (not illustrated) of the disclosure, the housing 110 may refer to a structure that forms some of the first surface 110A, the second surface 110B, and the third surface 110C.

In an embodiment of the disclosure, the first surface 110A may be formed by a front plate 102, at least part of which is substantially transparent (e.g., a glass plate including various coating layers, or a polymer plate). The second surface 110B may be formed by a back plate 111 that is substantially opaque. The back plate 111 may be formed of, for example, coated or colored glass, ceramic, polymer, metal (e.g., aluminum, stainless steel (STS), or magnesium), or a combination of at least two of the aforementioned materials. The third surface 110C may be formed by a side bezel structure (or, a side member) 118 that is coupled with the front plate 102 and the back plate 111 and that contains metal and/or polymer.

In another embodiment of the disclosure, the back plate 111 and the side bezel structure 118 may be integrally formed with each other and may contain the same material (e.g., a metallic material, such as aluminum).

In the illustrated embodiment of the disclosure, the front plate 102 may include two first areas 110D that curvedly and seamlessly extend from partial areas of the first surface 110A toward the back plate 111. The first areas 110D may be located at opposite long edges of the front plate 102.

In the illustrated embodiment of the disclosure, the back plate 111 may include two second areas 110E that curvedly and seamlessly extend from partial areas of the second surface 110B toward the front plate 102. The second areas 110E may be located at opposite long edges of the back plate 111.

In another embodiment of the disclosure, the front plate 102 (or, the back plate 111) may include only one of the first areas 110D (or, the second areas 110E). Furthermore, in another embodiment of the disclosure, the front plate 102 (or, the back plate 111) may not include a part of the first areas 110D (or, the second areas 110E).

In an embodiment of the disclosure, when viewed from a side of the electronic device 100, the side bezel structure 118 may have a first thickness (or, width) at sides (e.g., short sides) not including the first areas 110D or the second areas 110E and may have a second thickness at sides (e.g., long sides) including the first areas 110D or the second areas 110E, the second thickness being smaller than the first thickness.

Figure 18:
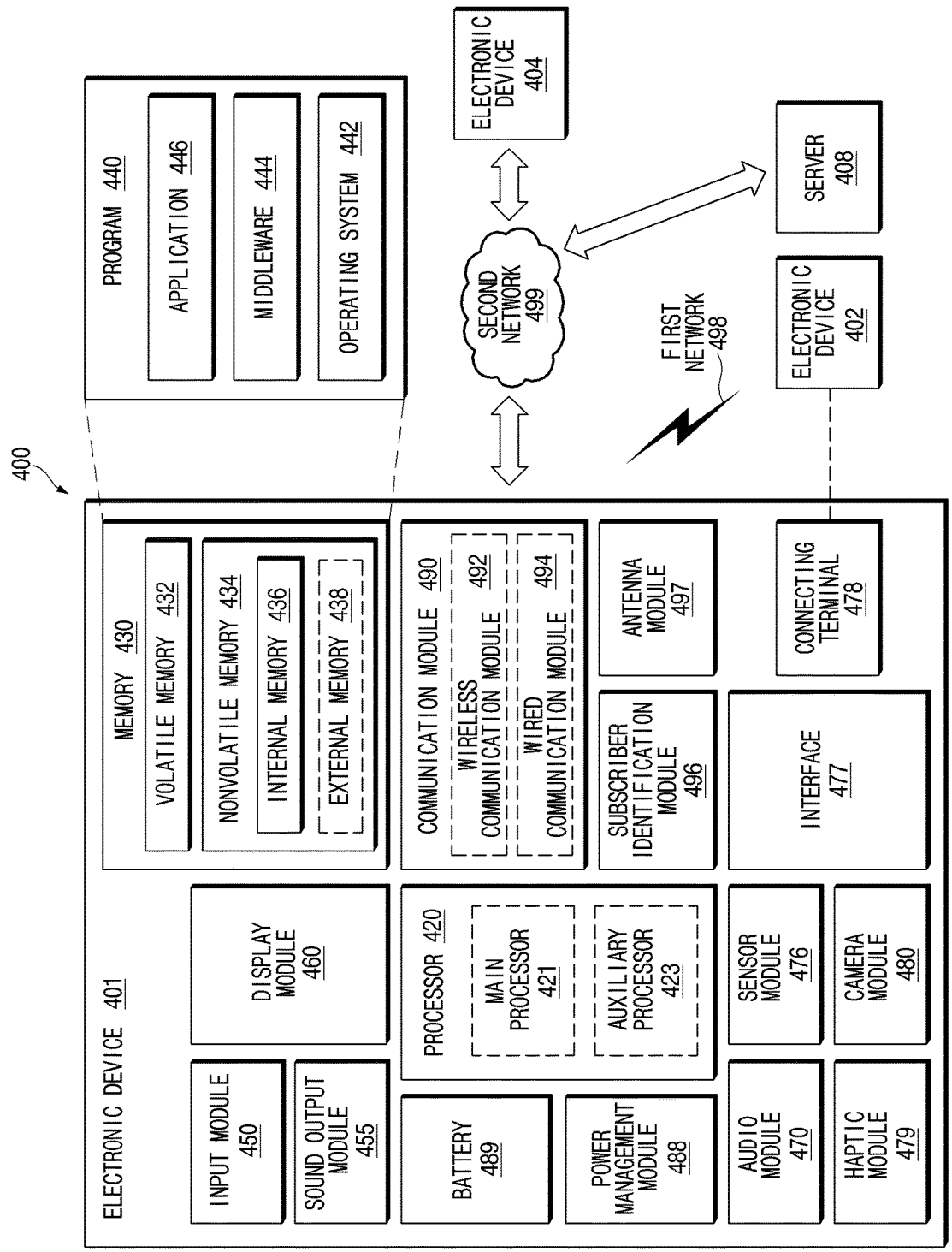
FIG. 18 is a block diagram of an electronic device in a network environment according to an embodiment of the disclosure.

In an embodiment of the disclosure, the electronic device 100 may include at least one of a display 101, an audio module 103, 104, and 107 (e.g., an audio module 470 of FIG. 18), a sensor module (not illustrated) (e.g., a sensor module 476 of FIG. 18), camera modules 105 112, and 113 (e.g., a camera module 480 of FIG. 18), key input devices 117 (e.g., an input device 450 of FIG. 18), a light emitting element (not illustrated), or a connector hole 108 (e.g., a connecting terminal 478 of FIG. 18). In another embodiment of the disclosure, the electronic device 100 may not include at least one component (e.g., the key input devices 117 or the light emitting elements (not illustrated)) among the aforementioned components, or may additionally include other component(s).

In an embodiment of the disclosure, the display 101 may be visually exposed through most of the front plate 102. For example, at least part of the display 101 may be visually exposed through the front plate 102 that includes the first surface 110A and the first areas 110D of the third surface 110C. The display 101 may be disposed on a rear surface of the front plate 102.

In an embodiment of the disclosure, the periphery of the display 101 may be formed to be substantially the same as the shape of the adjacent outside edge of the front plate 102. In another embodiment (not illustrated), the gap between the outside edge of the display 101 and the outside edge of the front plate 102 may be substantially constant to expand the area by which the display 101 is visually exposed.

In an embodiment of the disclosure, a surface of the housing 110 (or, the front plate 102) may include a screen display area that is formed as the display 101 is visually exposed. For example, the screen display area may include the first surface 110A and the first areas 110D of the side surface.

In another embodiment (not illustrated) of the disclosure, the screen display area 110A and 110D may include a sensing area (not illustrated) that is configured to obtain biometric information of a user. Here, when the screen display area 110A and 110D includes the sensing area, this may mean that at least part of the sensing area overlaps the screen display area 110A and 110D. For example, the sensing area (not illustrated) may refer to an area capable of displaying visual information by the display 101 like other areas of the screen display area 110A and 110D and additionally obtaining biometric information (e.g., a fingerprint) of the user.

In an embodiment of the disclosure, the screen display area 110A and 110D of the display 101 may include an area through which the first camera module 105 (e.g., a punch hole camera) is visually exposed. For example, at least part of the periphery of the area through which the first camera module 105 is visually exposed may be surrounded by the screen display area 110A and 110D. In an embodiment of the disclosure, the first camera module 105 may include a plurality of camera modules (e.g., the camera module 480 of FIG. 18).

In another embodiment (not illustrated) of the disclosure, the display 101 may be coupled with, or disposed adjacent to, touch detection circuitry, a pressure sensor capable of measuring the intensity (pressure) of a touch, and/or a digitizer for detecting a stylus pen of a magnetic field type.

In an embodiment of the disclosure, the audio module 103, 104, and 107 may include the microphone holes 103 and 104 and the speaker hole 107.

In an embodiment of the disclosure, the microphone holes 103 and 104 may include the first microphone hole 103 formed in a partial area of the third surface 110C and the second microphone hole 104 formed in a partial area of the second surface 110B. A microphone (not illustrated) for obtaining an external sound may be disposed in the microphone holes 103 and 104. The microphone may include a plurality of microphones to detect the direction of a sound.

In an embodiment of the disclosure, the second microphone hole 104 formed in the partial area of the second surface 110B may be disposed adjacent to the camera modules 105, 112, and 113. For example, the second microphone hole 104 may obtain sounds when the camera modules 105, 112, and 113 are executed, or may obtain sounds when other functions are executed.

In an embodiment of the disclosure, the speaker hole 107 may include an external speaker hole 107 and a receiver hole for telephone call (not illustrated). The external speaker hole 107 may be formed in a portion of the third surface 110C of the electronic device 100. In another embodiment of the disclosure, the external speaker hole 107 and the microphone hole 103 may be implemented as a single hole. Although not illustrated, the receiver hole for telephone call (not illustrated) may be formed in another portion of the third surface 110C. For example, the receiver hole for telephone call may be formed in another portion (e.g., a portion facing the +y-axis direction) of the third surface 110C that faces the portion (e.g., a portion facing the −y-axis direction) of the third surface 110C in which the external speaker hole 107 is formed. According to various embodiments of the disclosure, the receiver hole for telephone call may not be formed in a portion of the third surface 110C and may be formed by a separation space between the front plate 102 (or, the display 101) and the side bezel structure 118.

In an embodiment of the disclosure, the electronic device 100 may include at least one speaker (e.g., a first speaker unit 250 of FIGS. 5 to 8 or a second speaker unit 310 of FIGS. 10 to 13A) that is configured to output a sound outside the housing 110 through the external speaker hole 107 or the receiver hole for telephone call (not illustrated). According to various embodiments of the disclosure, the speaker may include a piezoelectric speaker that does not include the speaker hole 107.

In an embodiment of the disclosure, the sensor module (not illustrated) may generate an electrical signal or a data value that corresponds to an operational state inside the electronic device 100 or an environmental state external to the electronic device 100. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment of the disclosure, the camera modules 105, 112, and 113 may include the first camera module 105

(e.g., a punch hole camera) exposed on the first surface 110A of the electronic device 100, the second camera module 112 exposed on the second surface 110B, and/or the flash 113.

In an embodiment of the disclosure, the first camera module 105 may be visually exposed through part of the screen display area 110A and 110D of the display 101. For example, the first camera module 105 may be visually exposed on a partial area of the screen display area 110A and 110D through an opening (not illustrated) that is formed in part of the display 101.

In an embodiment of the disclosure, the second camera module 112 may include a plurality of camera modules (e.g., a dual camera, a triple camera, or a quad camera). However, the second camera module 112 is not necessarily limited to including the plurality of camera modules and may include one camera module.

The first camera module 105 and the second camera module 112 may include one or more lenses, an image sensor, and/or an image signal processor. The flash 113 may include, for example, a light emitting diode or a xenon lamp. In some embodiments of the disclosure, two or more lenses (an IR camera lens, a wide angle lens, and a telephoto lens) and image sensors may be disposed on one surface of the electronic device 100.

In an embodiment of the disclosure, the key input devices 117 may be disposed on the third surface 110C (e.g., the first areas 110D and/or the second areas 110E) of the housing 110. In another embodiment of the disclosure, the electronic device 100 may not include all or some of the key input devices 117, and the key input devices 117 not included may be implemented in a different form, such as a soft key, on the display 101. In another embodiment of the disclosure, the key input devices may include a sensor module (not illustrated) that forms the sensing area (not illustrated) that is included in the display area 110A and 110D.

In an embodiment of the disclosure, the connector hole 108 may accommodate a connector. The connector hole 108 may be disposed in the third surface 110C of the housing 110. For example, the connector hole 108 may be disposed in the third surface 110C so as to be adjacent to at least part of the audio module (e.g., the microphone hole 103 and the speaker hole 107). In another embodiment of the disclosure, the electronic device 100 may include the first connector hole 108 capable of accommodating a connector (e.g., a USB connector) for transmitting/receiving power and/or data with an external electronic device, and/or a second connector hole (not illustrated) capable of accommodating a connector (e.g., an earphone jack) for transmitting/receiving audio signals with an external electronic device.

In an embodiment of the disclosure, the electronic device 100 may include the light emitting element (not illustrated). For example, the light emitting element (not illustrated) may be disposed on the first surface 110A of the housing 110. The light emitting element (not illustrated) may provide state information of the electronic device 100 in the form of light. In another embodiment of the disclosure, the light emitting element (not illustrated) may provide a light source that operates in conjunction with operation of the camera module 105. For example, the light emitting element (not illustrated) may include an LED, an IR LED, and/or a xenon lamp.

Figure 3:
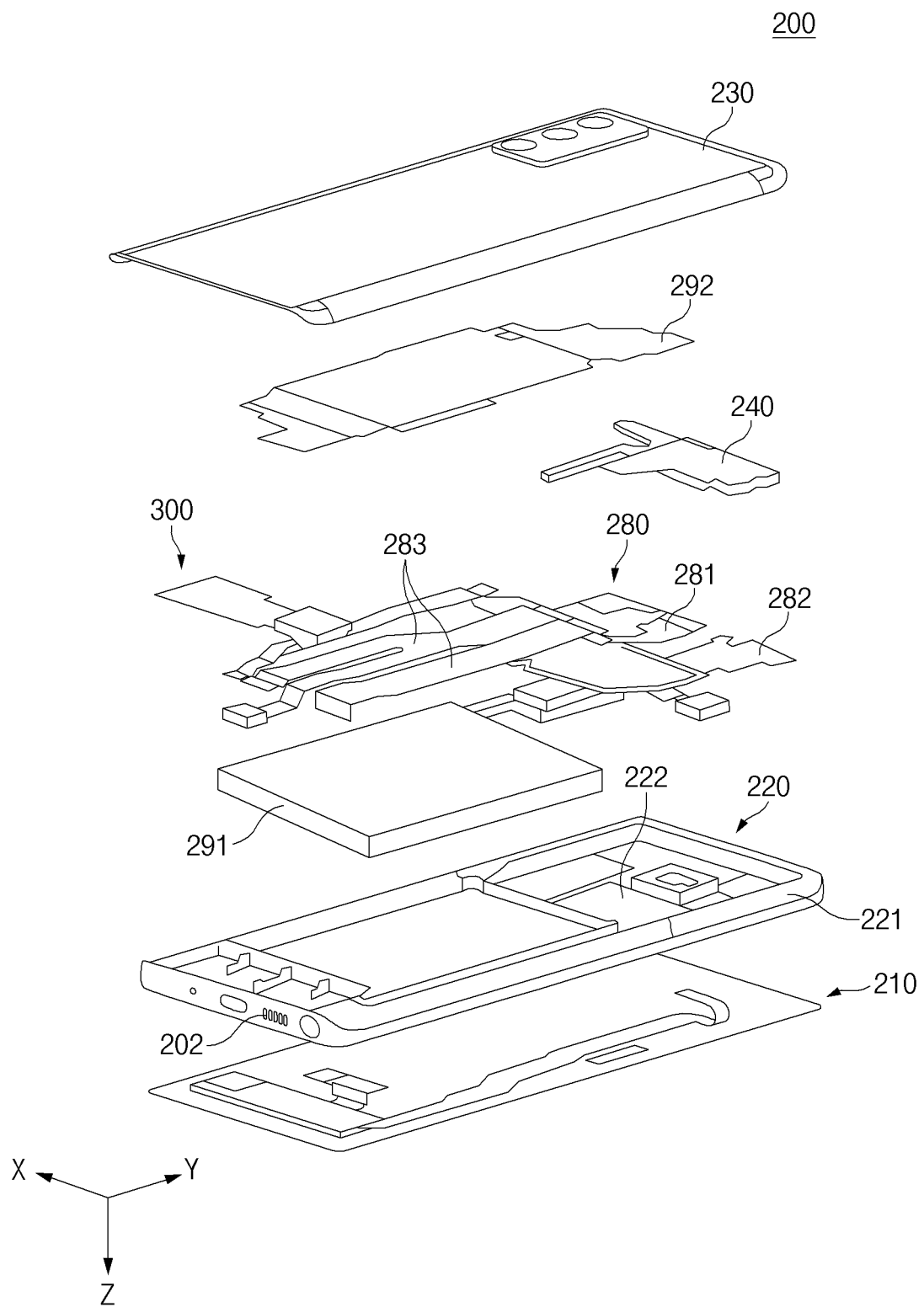
FIG. 3 is an exploded perspective view of an electronic device according to an embodiment of the disclosure.

FIG. 3 is an exploded perspective view of an electronic device according to an embodiment of the disclosure.

Referring to FIG. 3, the electronic device 200 (e.g., the electronic device 100 of FIGS. 1 and 2) according to the embodiment may include a display module 210 (e.g., the front plate 102 and the display 101 of FIG. 1), a side member 220 (e.g., the side bezel structure 118 of FIG. 1), a back plate 230 (e.g., the back plate 111 of FIG. 2), a support member 240, a printed circuit board 280, a battery 291, an antenna 292, and a speaker assembly 300.

Some of the components of the electronic device 200 illustrated in FIG. 3 may be identical or similar to some of the components of the electronic device illustrated in FIGS. 1 and 2 (e.g., the electronic device 100 of FIGS. 1 and 2). Hereinafter, repetitive descriptions will be omitted.

In an embodiment of the disclosure, the display module 210 may be disposed under the side member 220. For example, the display module 210 may be located in the +z-axis direction from the side member 220. The display module 210 may be coupled with the side member 220. The display module 210 may form part of the outer surface (or, the exterior) of the electronic device 200.

In an embodiment of the disclosure, the display module 210 may include a front plate (e.g., the front plate 102 of FIG. 1) and a display (e.g., the display 101 of FIG. 1) disposed on one surface of the front plate 102. For example, the display 101 may be disposed on a rear surface of the front plate 102 so as to be located inside the electronic device 200.

In an embodiment of the disclosure, the side member 220 may be disposed between the display module 210 and the back plate 230. The side member 220 may be configured to surround a space between the back plate 230 and the display module 210.

In an embodiment of the disclosure, the side member 220 may include a frame structure 221 forming part of a side surface (e.g., the third surface 110C of FIG. 1) of the electronic device 200 and a plate structure 222 extending inward from the frame structure 221. For example, the plate structure 222 may be disposed inside the frame structure 221 so as to be surrounded by the frame structure 221. The plate structure 222 may be connected with the frame structure 221, or may be integrally formed with the frame structure 221. The plate structure 222 may be formed of a metallic material and/or a nonmetallic (e.g., polymer) material.

In an embodiment of the disclosure, the plate structure 222 may support other components included in the electronic device 200. For example, at least one of the printed circuit board 280, the battery 291, the support member 240, and the speaker assembly 300 may be disposed on the plate structure 222. For example, the printed circuit board 280 may be disposed on one surface (e.g., a surface facing the −z-axis direction) of the plate structure 222, and the support member 240 may be disposed on part (e.g., a first circuit board 281 and a second circuit board 282) of the printed circuit board 280 and the plate structure 222.

In an embodiment of the disclosure, the support member 240 may be disposed between the back plate 230 and the plate structure 222. The support member 240 may be coupled to the support member 240 so as to overlap at least part of the printed circuit board 280. For example, the support member 240 may face the plate structure 222 with the first circuit board 281 and the second circuit board 282 therebetween. Although not illustrated, the support member 240 may support a speaker (e.g., the first speaker unit 250 of FIGS. 5, 6, and 8) disposed inside the electronic device 200. The support member 240 may be located at an upper end (e.g., the +y-axis direction) of the electronic device 200, and the speaker supported by the support member 240 may be an upper speaker (e.g., a receiver for telephone call). However, the position of the support member 240 is not limited to the illustrated embodiment.

In an embodiment of the disclosure, the printed circuit board 280 may include one or more boards. For example, the printed circuit board 280 may include the first circuit board 281, the second circuit board 282, and a third circuit board 283. The first circuit board 281, the second circuit board 282, and the third circuit board 283 may be electrically connected with one another. For example, the third circuit board 283 may include a plurality of flexible printed circuit boards. According to various embodiments of the disclosure, any one of the first circuit board 281, the second circuit board 282, and/or the third circuit board 283 may be omitted. Furthermore, according to various embodiments of the disclosure, the first circuit board 281, the second circuit board 282, and the third circuit board 283 may be integrally formed with one another.

In an embodiment of the disclosure, a processor (e.g., a processor 420 of FIG. 18), a memory (e.g., a memory 430 of FIG. 18), and/or an interface (e.g., an interface 477 of FIG. 18) may be mounted on the printed circuit board 280. The processor may include, for example, one or more of a central processing unit, an application processor, a graphic processing unit, an image signal processor, a sensor hub processor, or a communication processor. The memory may include, for example, a volatile memory or a nonvolatile memory.

The interface may include, for example, a high definition multimedia interface (HDMI), a universal serial bus (USB) interface, a secure digital (SD) card interface, and/or an audio interface. The interface may electrically or physically connect the electronic device 200 with an external electronic device and may include a USB connector, an SD card/multimedia card (MMC) connector, or an audio connector.

In an embodiment of the disclosure, the battery 291 (e.g., a battery 489 of FIG. 18) may supply power to at least one component of the electronic device 200. For example, the battery 291 may include a primary cell that is not rechargeable, a secondary cell that is rechargeable, or a fuel cell. At least part of the battery 291 may be disposed on substantially the same plane as the printed circuit board 280. The battery 291 may be integrally disposed inside the electronic device 200, or may be disposed so as to be detachable from the electronic device 200.

In an embodiment of the disclosure, the antenna 292 (e.g., an antenna module 497 of FIG. 18) may be disposed between the back plate 230 and the battery 291. The antenna 292 may include, for example, a near field communication (NFC) antenna, a wireless charging antenna, and/or a magnetic secure transmission (MST) antenna. For example, the antenna 292 may perform short-range communication with an external device, or may wirelessly transmit and receive power required for charging.

In an embodiment of the disclosure, the speaker assembly 300 may be disposed between the back plate 230 and the plate structure 222. The speaker assembly 300 may be implemented in a speaker structure of an enclosure type. For example, the speaker assembly 300 may include a speaker (e.g., the second speaker unit 310 of FIGS. 11 to 13A) and an enclosure (e.g., a speaker enclosure 320 of FIGS. 10 to 13A) in which the speaker is accommodated.

In an embodiment of the disclosure, the speaker assembly 300 may be located adjacent to a lower end (e.g., the −y-axis direction) of the electronic device 200. For example, the speaker assembly 300 may output a sound outside the electronic device 200 through a speaker hole 202 (e.g., the speaker hole 107 of FIGS. 1 and 2) formed in a surface facing the −y-axis direction among side surfaces of the frame structure 221. However, the position of the speaker assembly 300 is not limited to the illustrated embodiment.

According to an embodiment of the disclosure, the speaker (e.g., an upper speaker) supported by the support member 240 and the speaker (e.g., a lower speaker) implemented as the speaker assembly 300 may be disposed inside the electronic device 200. According to various embodiments of the disclosure, the position of the speaker supported by the support member 240 and the position of the speaker assembly 300 may be changed. Furthermore, according to various embodiments of the disclosure, the electronic device 200 may further include another speaker.

Figure 4:
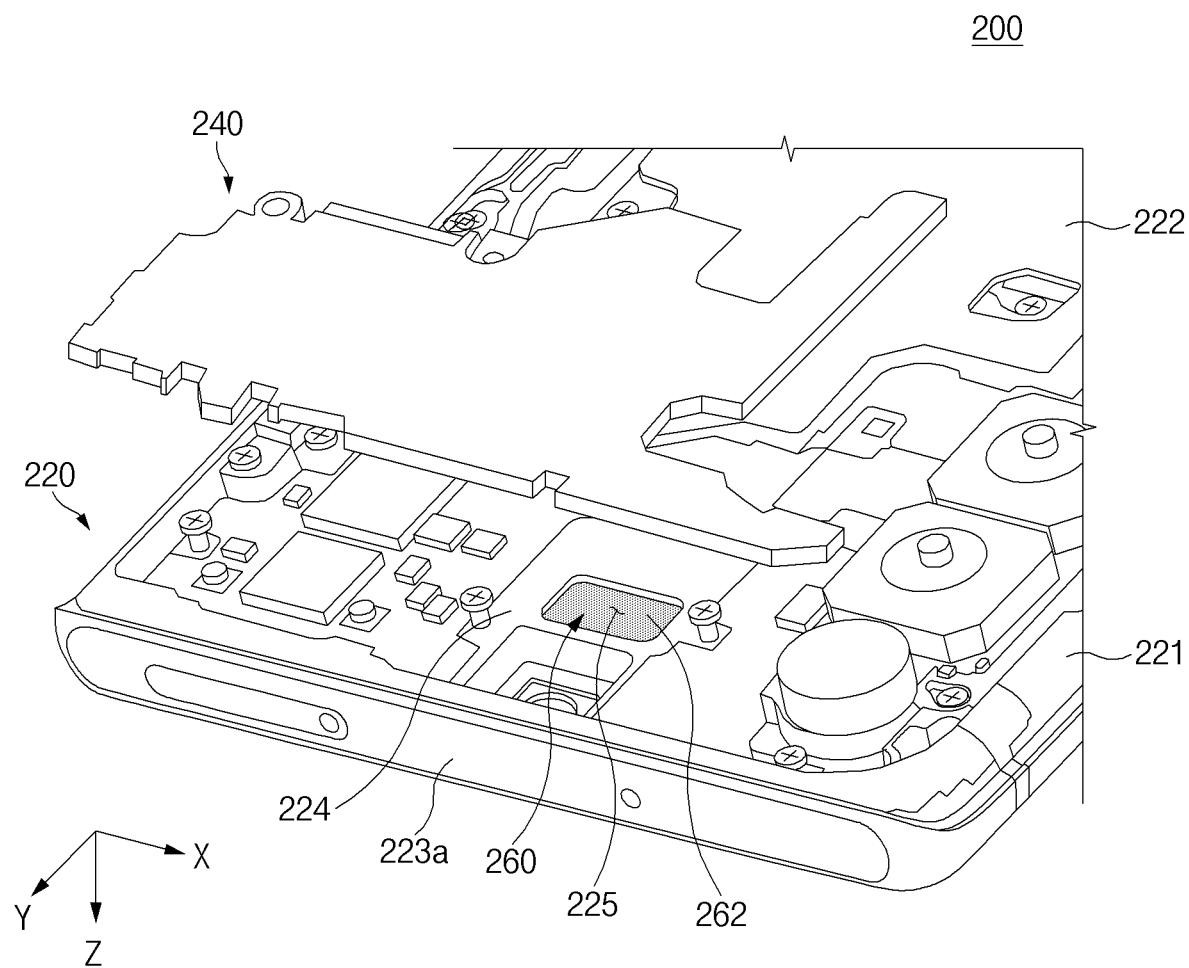
FIG. 4 is a view illustrating a side member and a first support member of an electronic device according to an embodiment of the disclosure.
Figure 5:
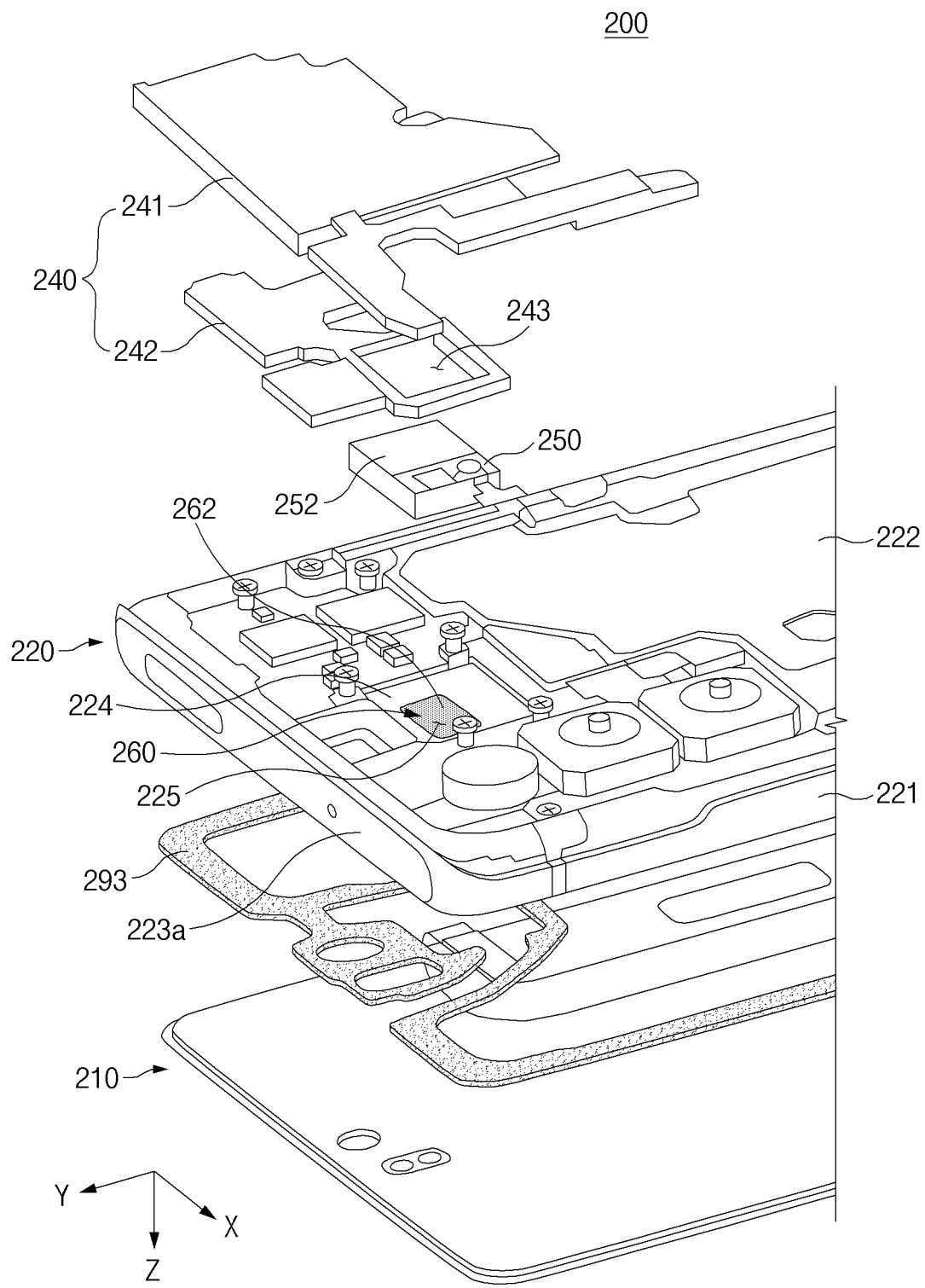
FIG. 5 is an exploded perspective view illustrating a support structure of a first speaker unit of an electronic device according to an embodiment of the disclosure.
Figure 6:
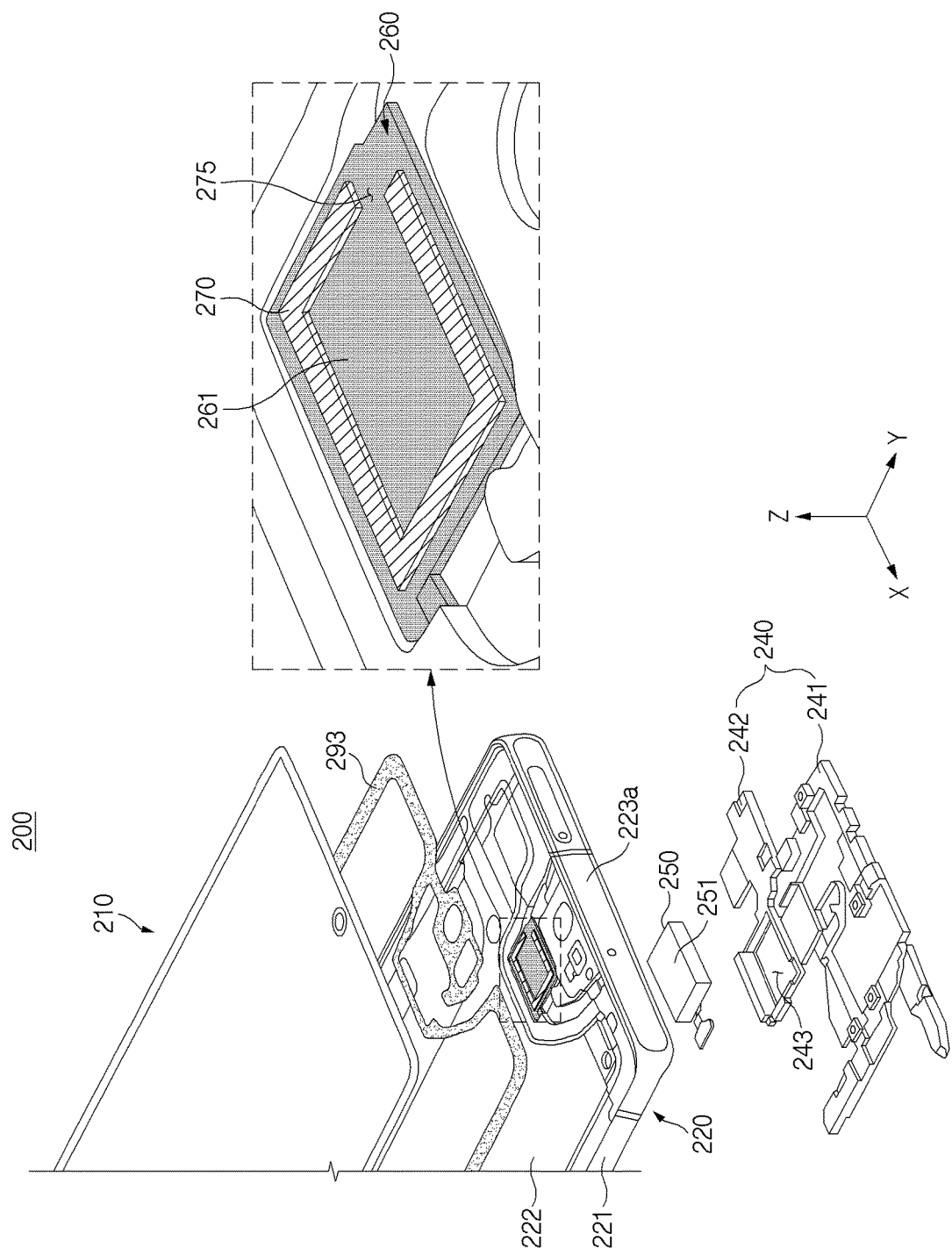
FIG. 6 is an exploded perspective view illustrating a support structure of a first speaker unit of an electronic device according to an embodiment of the disclosure.

FIG. 4 is a view illustrating a side member and a support member of an electronic device according to an embodiment of the disclosure. FIG. 5 is a view illustrating a support structure of a first speaker unit of an electronic device according to an embodiment of the disclosure. FIG. 6 is a view illustrating a support structure of a first speaker unit of an electronic device according to an embodiment of the disclosure.

FIG. 4 is a view of the electronic device as viewed from the rear, where the support member is separated from the side member. FIG. 5 is a view of the electronic device as viewed from the rear, where a display panel, the first speaker unit, and the support member are separated. FIG. 6 is a view of the electronic device as viewed from the front, where the display panel, the first speaker unit, and the support member are separated.

Referring to FIGS. 4 to 6, the electronic device 200 according to the embodiment may include the display module 210, the side member 220, the support member 240, the first speaker unit 250, a first metal plate 260, a sealing member 270, and an adhesive member 293.

FIGS. 4 to 6 may be views in which a back plate (e.g., the back plate 111 of FIG. 2 or the back plate 230 of FIG. 3) of the electronic device 200 is omitted. Some of the components of the electronic device 200 illustrated in FIGS. 4 to 6 may be identical or similar to some of the components of the electronic device 200 illustrated in FIG. 3. Hereinafter, repetitive descriptions will be omitted.

In an embodiment of the disclosure, the side member 240 may be coupled to the side member 220. The support member 240 may be coupled to a partial area of the plate structure 222 of the side member 220 and may be disposed to face the display module 210 with the plate structure 222 therebetween. The support member 240 may be located adjacent to the upper end of the electronic device 200. For example, the support member 240 may be disposed adjacent to a first side surface 223a of the frame structure 221 of the side member 220. The first side surface 223a of the frame structure 221 may refer to the side surface facing the +y-axis direction among a plurality of side surfaces (e.g., the third surface 110C of FIG. 1).

In an embodiment of the disclosure, the support member 240 may support the first speaker unit 250. The support member 240 may support the first speaker unit 250 such that the first speaker unit 250 is stably fixed to and/or seated on the plate structure 222 inside the electronic device 200 (or, a housing (e.g., the housing 110 of FIGS. 1 and 2)). For example, the first speaker unit 250 may be disposed between the support member 240 and the plate structure 222 when the support member 240 is coupled to the plate structure 222.

In an embodiment of the disclosure, the support member 240 may include a first support structure 241 formed in a plate form and a second support structure 242 that is disposed on one surface of the first support structure 241 and on which the first speaker unit 250 is disposed. The first speaker unit 250 may be seated on part of the second support structure 242, and the second support structure 242 may be seated on the first support structure 241. For example, the second support structure 242 may be disposed between the first support structure 241 and the plate structure 222. According to the illustrated embodiment of the disclosure, the first support structure 241 and the second support structure 242 may be implemented as separate parts. However, the support member 240 is not limited thereto. According to various embodiments of the disclosure, the first support structure 241 and the second support structure 242 may be integrally formed with each other to form one part.

In an embodiment of the disclosure, an opening area 243 may be formed in at least part of the second support structure 242. The first speaker unit 250 may be disposed to overlap at least part of the opening area 243. At least part of the first speaker unit 250 may directly face a partial area of the first support structure 241 through the opening area 243. For example, a back volume of the first speaker unit 250 may be formed between the first support structure 241 and the first speaker unit 250 by the opening area 243.

In an embodiment of the disclosure, the first speaker unit 250 may be disposed between the support member 240 and the plate structure 222. The first speaker unit 250 may be located adjacent to the first side surface 223a of the frame structure 221 inside the electronic device 200 and may be supported by the support member 240 and the plate structure 222. For example, a seating portion 224 on which the first speaker unit 250 is seated may be formed on part of the plate structure 222. The first speaker unit 250 may be disposed inside the electronic device 200 in the state of being supported by the seating portion 224 and the second support structure 242 in an up/down direction (e.g., the z-axis direction). For example, the first speaker unit 250 may be an upper speaker (e.g., a receiver speaker for telephone call) disposed at the upper end of the electronic device 200. However, the position and/or function of the first speaker unit 250 is illustrative, and the first speaker unit 250 is not limited to the described contents.

According to the illustrated embodiment of the disclosure, the first speaker unit 250 may be supported by the support member 240 such that the rear side of the first speaker unit 250 is surrounded by the support member 240. However, the support structure of the first speaker unit 250 is not limited to the illustrated embodiment. According to various embodiments of the disclosure, the electronic device 200 may not include the support member 240, and the rear side of the first speaker unit 250 may be surrounded by the back plate 230 without being supported by the support member 240.

In an embodiment of the disclosure, the first speaker unit 250 may convert an electrical signal into a sound signal. The first speaker unit 250 may output a sound to the outside of the electronic device 200. For example, the sound generated from the first speaker unit 250 may travel outside the electronic device 200 through a separation space formed between the display module 210 and the side member 220 (or, the frame structure 221). However, a travel path of the sound generated from the first speaker unit 250 is not limited to the described contents. According to various embodiments of the disclosure, at least one hole (not illustrated) fluidly connected with the inside of the electronic device 200 may be formed in the first side surface 223a of the frame structure 221, and the sound generated from the first speaker unit 250 may travel outside the electronic device 200 through the hole (not illustrated) that is formed in the first side surface 223a.

In an embodiment of the disclosure, the first speaker unit 250 may include a first surface 251 facing toward the seating portion 224 of the plate structure 222 and a second surface 252 facing away from the first surface 251. The second surface 252 may face toward the support member 240 (e.g., the first support structure 241). For example, when the second surface 252 of the first speaker unit 250 is viewed from above, part of the second surface 252 may overlap the opening area 243 of the second support structure 242. The first surface 251 of the first speaker unit 250 may be a surface from which a sound is substantially generated (or, output). For example, a vibration plate (e.g., a diaphragm) (not illustrated) included in the first speaker unit 250 may be disposed to face substantially the same direction as the first surface 251. The first surface 251 (e.g., the vibration plate) of the first speaker unit 250 may output a sound toward the plate structure 222. For example, a first through-hole 225 surrounded by the seating portion 224 may be formed in a partial area of the plate structure 222, and the sound output from the first speaker unit 250 may travel in a direction (e.g., the +z-axis direction) toward the display module 210 through the first through-hole 225.

In an embodiment of the disclosure, the first speaker unit 250 may include various types of speakers depending on audio frequency characteristics (e.g., sound ranges). In various embodiments of the disclosure, the first speaker unit 250 may include a woofer speaker that produces sounds of low pitch and/or a tweeter speaker that produces sounds of high pitch. For example, the woofer speaker may reproduce low-frequency sounds from about 100 Hz to about 299 Hz, and the tweeter speaker may reproduce high-frequency sounds from about 3 KHz to about 6.9 KHz. However, the type of the first speaker unit 250 included in the electronic device 200 is not limited to the described contents. According to various embodiments of the disclosure, the first speaker unit 250 may include a sub-woofer speaker, a mid-range speaker (e.g., a squawker speaker), a super tweeter speaker, a full range speaker, or a receiver.

In an embodiment of the disclosure, the first metal plate 260 may be disposed on the plate structure 222. For example, the first metal plate 260 may be disposed between the display module 210 and the plate structure 222. The first metal plate 260 may perform a function of shielding a magnetic field and/or a magnetic force generated from the first speaker unit 250. For example, the first speaker unit 250 may face the display module 210 with the first metal plate 260 therebetween. According to various embodiments of the disclosure, the first metal plate 260 may include a metal plate (e.g., steel plate cold commercial (SPCC)) made of a ferromagnetic material.

According to the illustrated embodiment of the disclosure, the first metal plate 260 may be manufactured as a separate part from the side member 220 and may be coupled (or, attached) to the side member 220. However, without being limited to the illustrated embodiment of the disclosure, the first metal plate 260 may be integrally formed with the side member 220 (e.g., the plate structure 222) in various embodiments of the disclosure. For example, the first metal plate 260 may be a portion of the plate structure 222.

In an embodiment of the disclosure, the first metal plate 260 may include a first surface 261 facing toward the display module 210 and a second surface 262 facing the opposite direction (e.g., the −z-axis direction) opposite to the direction of the first surface 261. For example, the second surface 262 of the first metal plate 260 may be seated on (or, attached to) part of the plate structure 222. The first metal plate 260 may be disposed on part of the plate structure 222 to cover the first through-hole 225 formed in the plate structure 222. For example, the first metal plate 260 may overlap the first through-hole 225 when the first surface 261 of the first metal plate 260 is viewed from above.

In an embodiment of the disclosure, the sealing member 270 may be disposed between the first metal plate 260 and the display module 210. For example, the sealing member 270 may be disposed on the first surface 261 of the first metal plate 260. The sealing member 270 may be brought into close contact with the first surface 261 of the first metal plate 260 and the rear surface (e.g., the surface facing the −z-axis direction) of the display module 210 to partially seal the space between the first metal plate 260 and the display module 210. The sealing member 270 may be formed of a flexible and/or elastic material so as to be compressed between the first metal plate 260 and the display module 210. For example, the sealing member 270 may include at least one of poron, sponge, rubber, silicone, and tape.

In an embodiment of the disclosure, the sealing member 270 may protrude from the first surface 261 of the first metal plate 260 by a specified height. The sealing member 270 may extend along an edge portion of the first metal plate 260. The sealing member 270 may have a first opening portion 275 formed in at least part thereof, and a central portion of the sealing member 270 may be formed as an opening area as the first opening portion 275 extends. For example, a central portion of the first surface 261 of the first metal plate 260 may face the display module 210 through the opening area of the sealing member 270.

In an embodiment of the disclosure, the adhesive member 293 may be disposed between the plate structure 222 and the display module 210. For example, part of the adhesive member 293 may be disposed between an edge portion of the plate structure 222 and the display module 210. The display module 210 may be attached to the plate structure 222 through the adhesive member 293. The adhesive member 293 may partially seal the space between the plate structure 222 and the display module 210. The adhesive member 293 may contain a waterproof material. For example, the adhesive member 293 may be a waterproof tape.

In an embodiment of the disclosure, the adhesive member 293 may surround the first metal plate 260. For example, the adhesive member 293 may have, in at least part thereof, an opening in which the first metal plate 260 is disposed. When the first metal plate 260 and the adhesive member 293 are disposed on the plate structure 222, the first metal plate 260 may be disposed in the opening of the adhesive member 293, and at least part of the first metal plate 260 may be surrounded by the adhesive member 293.

Figure 7:
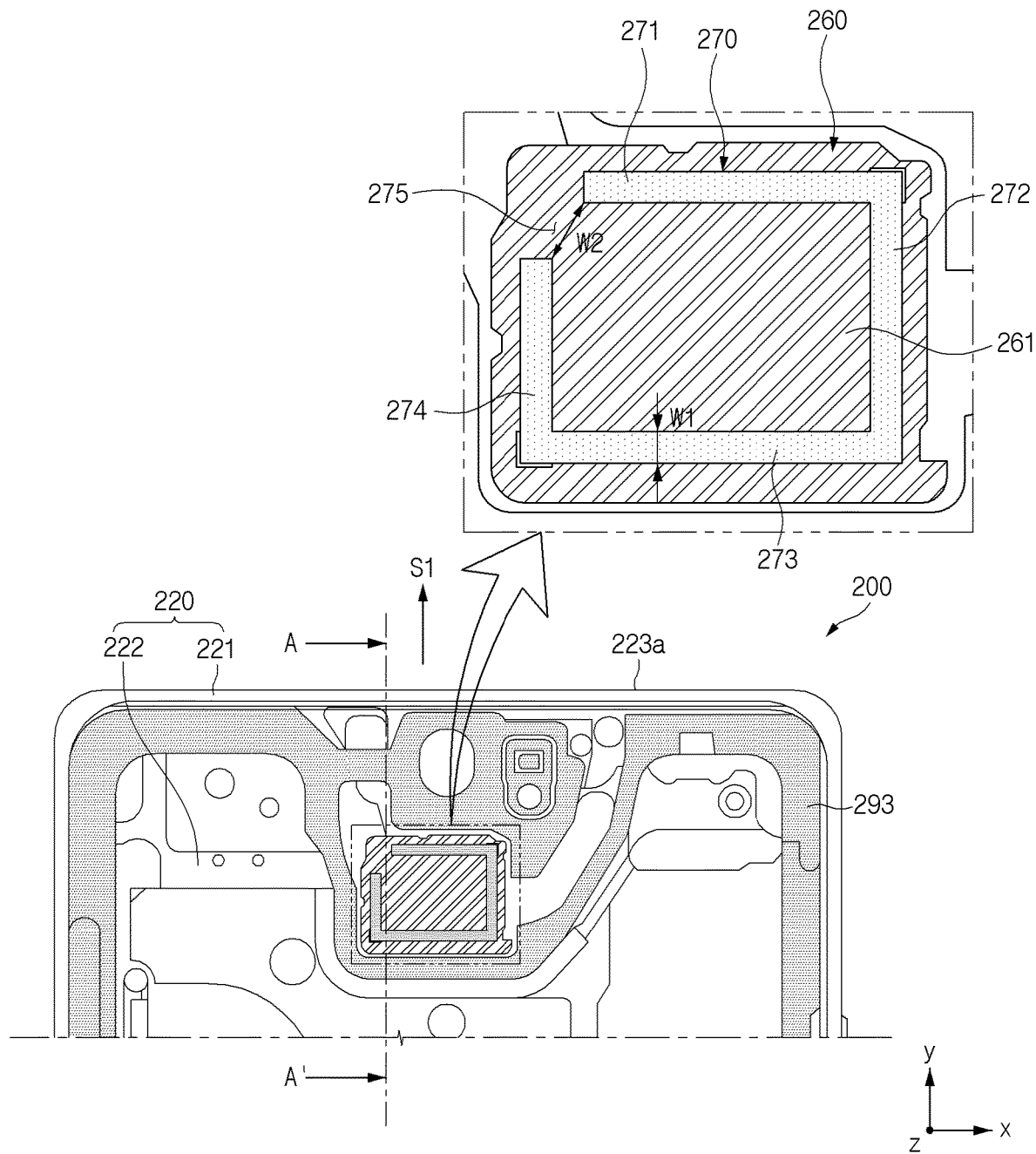
FIG. 7 is a plan view illustrating a side member, a first metal plate, and a sealing member of an electronic device according to an embodiment of the disclosure.
Figure 8:
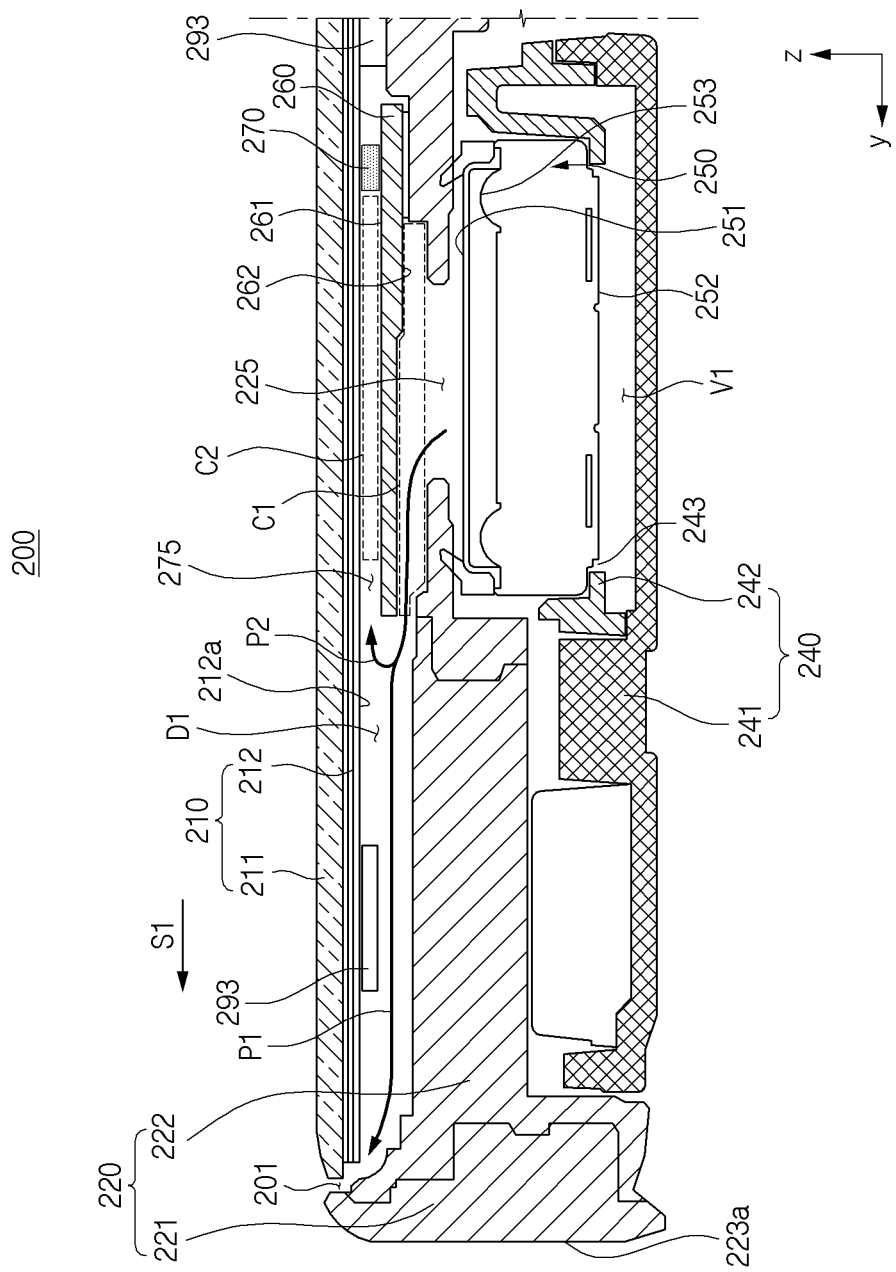
FIG. 8 is a sectional view illustrating a support structure of a first speaker unit of an electronic device according to an embodiment of the disclosure.

FIG. 7 is a plan view illustrating a side member, a first metal plate, and a sealing member of an electronic device according to an embodiment of the disclosure. FIG. 8 is a sectional view illustrating a support structure of a first speaker unit of an electronic device according to an embodiment of the disclosure.

FIG. 7 is a view of an electronic device as viewed from a front, where a front plate and a display are disassembled. FIG. 8 is a sectional view of an electronic device taken along line A-A' in FIG. 7.

Referring to FIGS. 7 and 8, the electronic device 200 according to the embodiment may include the display module 210, the side member 220, the support member 240, the first speaker unit 250, the sealing member 270, and the adhesive member 293.

FIG. 7 may be a view in which the display module 210 of the electronic device 200 is omitted. FIG. 8 may be a view in which the back plate of the electronic device 200 (e.g., the back plate 111 of the electronic device 100 of FIG. 2 or the back plate 230 of the electronic device 200 of FIG. 3) is omitted. Some of the components of the electronic device 200 illustrated in FIGS. 7 and 8 may be identical or similar to some of the components of the electronic device 200 illustrated in FIGS. 3 to 6. Hereinafter, repetitive descriptions will be omitted.

In an embodiment of the disclosure, the display module 210 may include a front plate 211 and a display 212 disposed on a rear surface of the front plate 211. For example, the display 212 may be attached to the rear surface of the front plate 211. The display 212 may be visually exposed outside the electronic device 200 through the front plate 211. The front plate 211, together with the side member 220 and the back plate (e.g., the back plate 230 of FIG. 3), may form the housing of the electronic device 200 (e.g., the housing 110 of the electronic device 100 of FIGS. 1 and 2). Although not illustrated, the front plate 211 and the back plate 230 may be disposed to face each other, and the side member 220 (e.g., the frame structure 221) may be configured to surround the space between the front plate 211 and the back plate 230.

In an embodiment of the disclosure, the side member 220 may include the frame structure 221 that forms part of the side surface of the electronic device 200 and the plate structure 222 extending from the frame structure 221 toward the inside of the electronic device 200. The display 212 may be attached to at least part of the plate structure 222. For example, the display 212 may be attached to the plate structure 222 through the adhesive member 293.

In an embodiment of the disclosure, at least part of the side member 220 and the display module 210 may be spaced apart from each other such that the outside of the electronic device 200 is fluidly connected with the inner space of the electronic device 200. For example, when the outside of the electronic device 200 is fluidly connected with the inner space of the electronic device 200, it may mean that the outside of the electronic device 200 and the inner space of the electronic device 200 are connected such that a fluid (or, sound) is movable between the outside of the electronic device 200 and the inner space of the electronic device 200.

In an embodiment of the disclosure, the inside surface of the frame structure 221 may be spaced apart from one end portion of the front plate 211 and one end portion of the display 212 by a specified gap, and the plate structure 222 may be spaced apart from a rear surface 212a of the display 212 by a specified gap. As the frame structure 221 and the front plate 211 are spaced apart from each other, a first speaker hole 201 may be formed between the frame structure 221 and the font plate 211. As the frame structure 221 and the plate structure 222 are spaced apart from the display 212, a first duct D1 fluidly connected with the first speaker hole 201 may be formed between the side member 220 and the display 212.

In an embodiment of the disclosure, the first through-hole 225 may be formed in at least part of the plate structure 222. The first through-hole 225 may be surrounded by the seating portion 224 supporting the first speaker unit 250. When the front plate 211 is viewed from above, the first through-hole 225 may overlap the first speaker unit 250. For example, a sound generated from the first speaker unit 250 may travel toward a space (e.g., a first chamber C1) between the first metal plate 260 and the plate structure 222 and/or the first duct D1 through the first through-hole 225. According to various embodiments of the disclosure, the sound generated from the first speaker unit 250 may travel outside the electronic device 200 through the first through-hole 225, the first duct D1, and the first speaker hole 201.

In an embodiment of the disclosure, the support member 240 may include the first support structure 241 facing the display 212 or the front plate 211 with the plate structure 222 therebetween and the second support structure 242 disposed on part of the first support structure 241 so as to be located between the first support structure 241 and the plate structure 222. The first speaker unit 250 may be disposed on the second support structure 242. For example, the first speaker unit 250 may be disposed in a predetermined space formed by the plate structure 222, the first support structure 241, and the second support structure 242. The first surface 251 of the first speaker unit 250 may be supported by the plate structure 222, and the second surface 252 of the first speaker unit 250 may be supported by the second support structure 242.

In an embodiment of the disclosure, the opening area 243 may be formed in the second support structure 242 and may surround at least part of the first speaker unit 250. For example, the first speaker unit 250 may face the first support structure 241 through the opening area 243. The first speaker unit 250 may be spaced apart from the first support structure 241 by a specified gap. For example, the second support structure 242 may support the first speaker unit 250 such that the second surface 252 of the first speaker unit 250 is spaced apart from the first support structure 241 by a specified gap, and a back volume V1 may be formed between the first speaker unit 250 and the first support structure 241. As the back volume V1 is formed between the first speaker unit 250 and the first support structure 241, a space for oscillation of a sound generated from the first speaker unit 250 may be ensured.

Although not illustrated, the back plate 230 (e.g., the back plate 111 of FIG. 2 or the back plate 230 of FIG. 3) may be disposed to face the front plate 211 with the support member 240 therebetween. For example, the back plate 230 may be disposed in the −z-axis direction with respect to the first support structure 241 based on the sectional view of FIG. 8. The first support structure 241 of the support member 240 may be supported by the back plate 230 in the state in which the back plate 230 is assembled. According to various embodiments of the disclosure, the electronic device 200 may not include the support member 240. In this case, the first speaker unit 250 may be disposed in the space formed by the plate structure 222 and the back plate 230.

In an embodiment of the disclosure, the first metal plate 260 may be disposed between the display 212 and the plate structure 222. The first metal plate 260 may be disposed on a portion of the plate structure 222 to cover the first through-hole 225 and/or the first speaker unit 250. For example, when the front plate 211 is viewed from above, the first metal plate 260 may overlap the first through-hole 225 and the first speaker unit 250 and may face the first speaker unit 250 with the first through-hole 225 therebetween. The first metal plate 260 may perform a function of isolating the first speaker unit 250 and the display module 210.

In an embodiment of the disclosure, the first chamber C1 may be formed between the first metal plate 260 and the plate structure 222. With respect to the first speaker unit 250, the first chamber C1 may be located in the direction that the first surface 251 (or, a vibration plate 253) of the first speaker unit 250 faces. The first chamber C1 may be fluidly connected with the first through-hole 225 and the first duct D1. For example, the first chamber C1 may be construed as a front volume of the first speaker unit 250. According to the illustrated embodiment of the disclosure, the first metal plate 260 disposed between the display 212 and the plate structure 222 may maintain the first duct D1 between the display 212 and the plate structure 222 at a predetermined interval or more and may reduce the gap of the first chamber C1 (e.g., the front volume), thereby improving the sound quality and/or acoustic performance of the first speaker unit 250.

In an embodiment of the disclosure, a second chamber C2 surrounded by the sealing member 270 may be formed between the first metal plate 260 and the display 212. For example, the first metal plate 260 may include the first surface 261 facing the display 212 and the second surface 262 facing away from the first surface 261. The sealing member 270 may be disposed on the first surface 261 of the first metal plate 260. When the first surface 261 of the first metal plate 260 is viewed from above, a partial area of the first surface 261 of the first metal plate 260 may be surrounded by the sealing member 270.

In an embodiment of the disclosure, the sealing member 270 may be disposed between the first surface 261 of the first metal plate 260 and the display 212. The sealing member 270 may be formed in a shape in which the central portion is open, and when the sealing member 270 is disposed between the first metal plate 260 and the display 212, the second chamber C2 may be formed between the first surface 261 of the first metal plate 260 and the display 212. For example, the second chamber C2 may refer to a predetermined space formed by a partial area of the first surface 261 of the first metal plate 260, a partial area of the display 212, and the sealing member 270.

In an embodiment of the disclosure, the first opening portion 275 may be formed in at least part of the sealing member 270. For example, the sealing member 270 may be formed in a loop shape that is open at one side. The second chamber C2 may be fluidly connected with the first chamber C1 and/or the first duct D1 by the first opening portion 275. The first opening portion 275 may be formed to correspond to the direction (e.g., a first direction S1 or the +y-axis direction) in which the first duct D1 extends from the first chamber C1.

In an embodiment of the disclosure, the first opening portion 275 may be formed to correspond to a direction in which a sound is radiated. A portion of the sealing member 270 may be opened (or, cut away) in the direction toward the first speaker hole 201 between the display 212 and the frame structure 221 to form the first opening portion 275. For example, a sound generated from the first speaker unit 250 may travel in substantially the first direction S1 and may be radiated outside the electronic device 200. The first opening portion 275 may be open in the first direction S1 such that at least part of a sound travelling in the first direction S1 from the first chamber C1 toward the first duct D1 travels into the second chamber C2 in the opposite direction to the first direction S1. For example, the first opening portion 275 may extend from part of the first duct D1 in the opposite direction to the first direction S1.

In an embodiment of the disclosure, the second chamber C2 other than the first opening portion 275 may be sealed from other spaces in the electronic device 200. For example, the second chamber C2 may be fluidly connected with a space outside the second chamber C2 through only the first opening portion 275.

In an embodiment of the disclosure, travel paths of a sound generated from the first speaker unit 250 may include at least one first travel path P1 traveling along the first chamber C1 and the first duct D1 and at least one second travel path P2 substantially facing away from the at least one first travel path P1 and traveling into the second chamber C2 through the first opening portion 275. The first opening portion 275 may overlap the at least one first travel path P1 when the first surface 261 of the first metal plate 260 is viewed from above.

In an embodiment of the disclosure, the sealing member 270 may include a first portion 271, a second portion 272 extending from the first portion 271 in a direction substantially perpendicular to the first portion 271, a third portion 273 extending from the second portion 272 in a direction substantially perpendicular to the second portion 272, and a fourth portion 274 extending from the third portion 273 in a direction substantially perpendicular to the third portion 273. One end of the first portion 271 and one end of the fourth portion 274 may be spaced apart from each other by a specified gap W2 without being connected together so that the first opening portion 275 may be formed.

In an embodiment of the disclosure, the size of the second chamber C2 may be changed depending on the height and/or width W1 of the sealing member 270. For example, as the height of the sealing member 270 is increased, the distance between the display 212 and the first metal plate 260 may be increased, and thus the size of the second chamber C2 may be increased. In contrast, as the height of the sealing member 270 is decreased, the distance between the display 212 and the first metal plate 260 may be decreased, and thus the size of the second chamber C2 may be decreased. Furthermore, for example, as the width W1 of the sealing member 270 is increased, the area of a region of the first surface 261 of the first metal plate 260 that is located inside the sealing member 270 may be decreased, and thus the size of the second chamber C2 may be decreased. In contrast, as the width W1 of the sealing member 270 is decreased, the area of a region of the first surface 261 of the first metal plate 260 that is located inside the sealing member 270 may be increased, and thus the size of the second chamber C2 may be increased.

According to the embodiment illustrated in FIG. 7, the portions (e.g., the first portion 271, the second portion 272, the third portion 273, and the fourth portion 274) of the sealing member 270 may be formed to have substantially the same width W1 and may have a substantially rectangular shape. However, the shape of the sealing member 270 illustrated in FIG. 7 is illustrative, and the sealing member 270 is not limited to the illustrated shape. According to various embodiments of the disclosure, the sealing member 270 may be formed such that one portion has a different width from another portion. Furthermore, according to various embodiments of the disclosure, the sealing member 270 may be formed in at least one of a circular shape, an oval shape, a rounded rectangular shape, and a polygonal shape other than a rectangular shape.

In an embodiment of the disclosure, a first resonator structure of the first speaker unit 250 may be formed in the electronic device 200 by using the first metal plate 260 and the sealing member 270. For example, the first resonator structure may be formed by the first opening portion 275 and the second chamber C2. The first opening portion 275 may form a resonator neck of the first resonator structure, and the second chamber C2 may form a resonator volume (or, a cavity) of the first resonator structure.

Referring to FIG. 8, a sound generated from the first speaker unit 250 may be radiated in a lateral direction (e.g., the first direction S1). For example, a sound generated from the vibration plate 253 of the first speaker unit 250 may travel along the first duct D1 extending in a direction (e.g., the y-axis direction) substantially perpendicular to the direction (e.g., the +z-axis direction) that the vibration plate 253 faces. According to an embodiment of the disclosure, by forming the first resonator structure through the first opening portion 275 and the second chamber C2, the electronic device 200 may prevent a phenomenon in which due to resonance caused by the first duct D1 and the first chamber C1, a sound at a specific frequency (e.g., a resonance frequency) is amplified and a bandwidth is narrowed.

In an embodiment of the disclosure, the first opening portion 275 and the second chamber C2 may extend from the first duct D1 and may be formed in a side branch structure. Accordingly, the first resonator structure may operate as a band rejection filter (e.g., a side branch acoustic absorber).

According to an embodiment of the disclosure, a sound generated from the first speaker unit 250 may enter and exit the second chamber C2 through the first opening portion 275, and thus a resonant action may be performed. As the resonant action is performed, sound absorption may occur at a specific frequency, which may lead to a decrease in output at the specific frequency and an increase in output in a frequency band around the specific frequency. According to various embodiments of the disclosure, a resonator (or, a side branch acoustic absorber) having desired characteristics may be designed by adjusting the volume of the second chamber C2 and the cross-sectional area and/or length of the first opening portion 275.

As the sealing member 270 is formed in a form in which a portion thereof is open, the electronic device 200 according to the embodiment may implement a resonance structure of the first speaker unit 250 using the first metal plate 260 and the sealing member 270. According to this, the resonator neck and the resonator volume may be changed by adjusting the size of the opening area of the sealing member 270, and thus the design and tuning of the resonator may be easily performed. Furthermore, as the resonance structure is designed by using existing subsidiary members included in the electronic device 200, for example, a shielding member (e.g., the first metal plate 260) or the sealing member 270, a mechanical design change of the electronic device 200 and an additional part are unnecessary, and the resonance structure may be applicable to various speaker systems.

Figure 9:
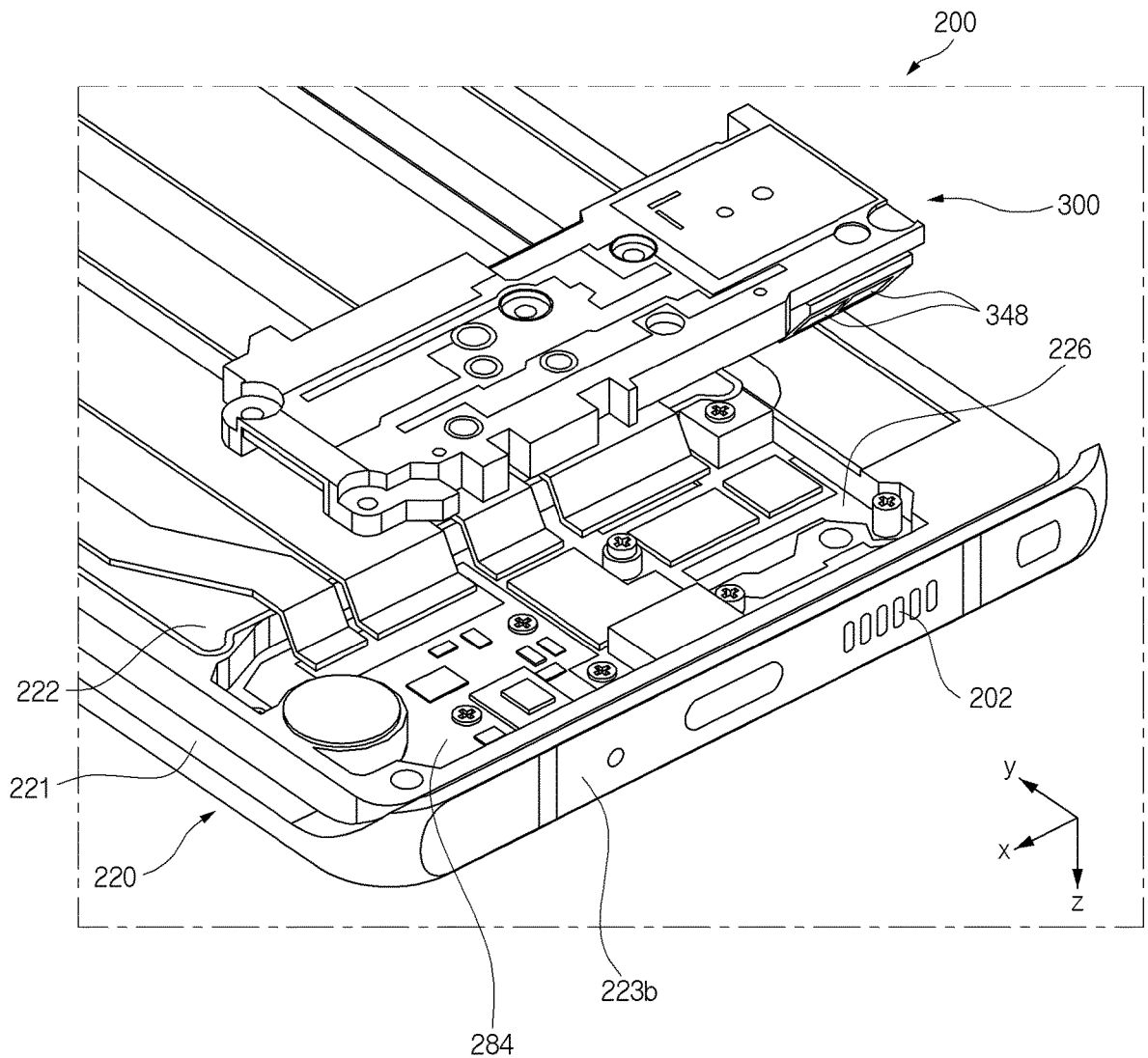
FIG. 9 is a view illustrating a side member and a speaker assembly of an electronic device according to an embodiment of the disclosure.
Figure 10:
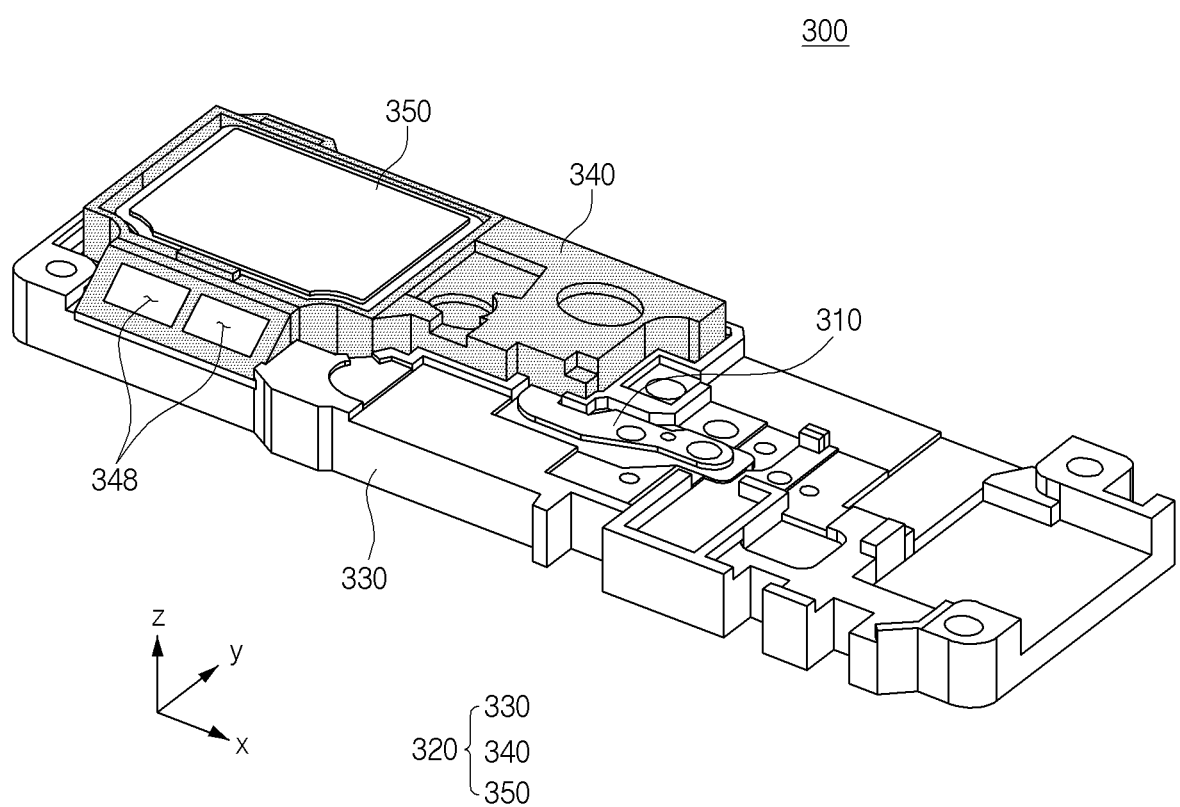
FIG. 10 is a perspective view of a speaker assembly of an electronic device according to an embodiment of the disclosure.
Figure 11:
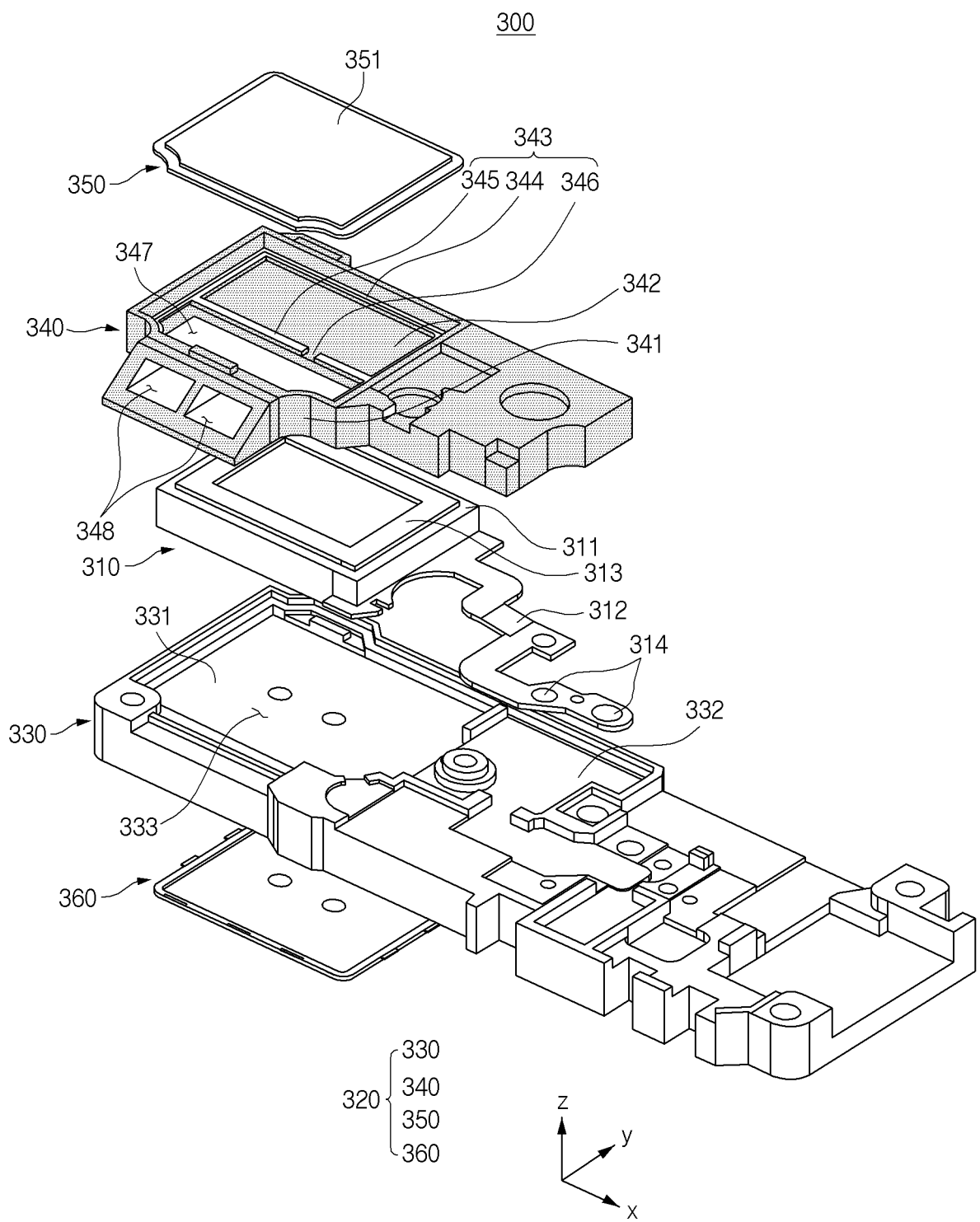
FIG. 11 is an exploded perspective view of a speaker assembly of an electronic device according to an embodiment of the disclosure.

FIG. 9 is a view illustrating a side member and a speaker assembly of an electronic device according to an embodiment of the disclosure. FIG. 10 is a perspective view illustrating a speaker assembly of an electronic device according to an embodiment of the disclosure. FIG. 11 is an exploded perspective view illustrating a speaker assembly of an electronic device according to an embodiment of the disclosure.

FIG. 9 is a view of the electronic device as viewed from the rear, where the speaker assembly is separated from the side member. FIG. 10 is a view of a speaker assembly as viewed in a direction different from a direction illustrated in FIG. 9. FIG. 11 is a view illustrating a state in which a speaker assembly is disassembled.

Referring to FIG. 9, the electronic device 200 according to the embodiment may include the side member 220 and the speaker assembly 300.

FIG. 9 may be a view in which the back plate (e.g., the back plate 230 of FIG. 3) of the electronic device 200 is omitted. Some of the components of the electronic device 200 illustrated in FIG. 9 may be identical or similar to some of the components of the electronic device 200 illustrated in FIG. 3. Hereinafter, repetitive descriptions will be omitted.

In an embodiment of the disclosure, the speaker assembly 300 may be disposed on the side member 220. The speaker assembly 300 may be coupled to part of the plate structure 222 of the side member 220. For example, the plate structure 222 may have a speaker assembly receiving section 226 in which the speaker assembly 300 is disposed. A partial area of the plate structure 222 may be recessed to a specified depth compared to another partial area of the plate structure 222 to form the speaker assembly receiving section 226. For example, at least part of the speaker assembly 300 may be disposed in the speaker assembly receiving section 226. A circuit board 284 electrically connected with part of the speaker assembly 300 may be disposed in the speaker assembly receiving section 226.

In an embodiment of the disclosure, the speaker assembly 300 may be located adjacent to the lower end of the electronic device 200. For example, the speaker assembly 300 may be disposed adjacent to a second side surface 223b facing a first side surface (e.g., the first side surface 223a of FIGS. 5 to 8) of the frame structure 221. For example, the second side surface 223b of the frame structure 221 may refer to the side surface facing the −y-axis direction among the plurality of side surfaces (e.g., the third surface 110C of FIG. 1). The second side surface 223b may have the second speaker hole 202 (e.g., the external speaker hole 107 of FIGS. 1 and 2) through which a sound generated from the speaker assembly 300 travels outside the electronic device 200. For example, the speaker assembly 300 may be disposed such that sound holes 348 formed on one side of the speaker assembly 300 face the second speaker hole 202. However, according to various embodiments of the disclosure, the second speaker hole 202 may not be formed in the frame structure 221.

According to an embodiment of the disclosure, the speaker assembly 300 including a second speaker unit (e.g., the second speaker unit 310 of FIGS. 10 and 11) may be a lower speaker disposed at the lower end of the electronic device 200, and a first speaker unit (e.g., the first speaker unit 250 of FIGS. 5 to 8) may be an upper speaker disposed at the upper end of the electronic device 200 (e.g., refer to FIGS. 4 to 8). However, this is illustrative, and according to various embodiments of the disclosure, the positions of the speaker assembly 300 (or, the second speaker unit 310) and the first speaker unit 250 may be changed. For example, the second speaker unit 310 disposed in an enclosure type in the electronic device 200 may be disposed at the upper end of the electronic device 200, and the first speaker unit 250 disposed as a single component in the electronic device 200 may be disposed at the lower end of the electronic device 200.

Referring to FIGS. 10 and 11, the speaker assembly 300 of the electronic device 200 according to the embodiment may include the second speaker unit 310 and the speaker enclosure 320.

In an embodiment of the disclosure, the second speaker unit 310 may be accommodated in the speaker enclosure 320. The second speaker unit 310 may convert an electrical signal into a sound signal. The second speaker unit 310 may output a sound to the outside of the electronic device 200. For example, a sound generated from the second speaker unit 310 may travel outside the speaker enclosure 320 through the sound holes 348 of the speaker enclosure 320, and the sound travelling through the sound holes 348 may travel outside the electronic device 200 through the second speaker hole 202.

In an embodiment of the disclosure, the second speaker unit 310 may include a main body portion 311 that substantially outputs a sound and a connecting portion 312 that electrically connects the second speaker unit 310 and the circuit board 284. The main body portion 311 may include a vibration plate 313 (e.g., a diaphragm). Although not illustrated, the main body portion 311 may further include a yoke (not illustrated), a voice coil (not illustrated), and/or a magnet (not illustrated). The connecting portion 312 may extend from one side of the main body portion 311 and may be electrically connected with the circuit board 284 disposed on the plate structure 222. For example, a conductive area 314 making electrical contact with part of the circuit board 284 may be formed on at least part of the connecting portion 312. The part of the connecting portion 312 on which the conductive area 314 is formed may be exposed outside the speaker enclosure 320.

In an embodiment of the disclosure, the second speaker unit 310 may include various types of speakers depending on audio frequency characteristics (e.g., sound ranges). In various embodiments of the disclosure, the second speaker unit 310 may include a woofer speaker that produces sounds of low pitch and/or a tweeter speaker that produces sounds of high pitch. For example, the woofer speaker may reproduce low-frequency sounds from about 100 Hz to about 299 Hz, and the tweeter speaker may reproduce high-frequency sounds from about 3 KHz to about 6.9 KHz. However, the type of the second speaker unit 310 included in the electronic device 200 is not limited to the described contents. According to various embodiments of the disclosure, the second speaker unit 310 may include a sub-woofer speaker, a mid-range speaker (e.g., a squawker speaker), a super tweeter speaker, or a full range speaker.

In an embodiment of the disclosure, the speaker enclosure 320 may form the exterior of the speaker assembly 300. At least part of the second speaker unit 310 may be accommodated in the speaker enclosure 320. For example, at least part (e.g., the portion on which the conductive area 314 is formed) of the connecting portion 312 of the second speaker unit 310 may be exposed outside the speaker enclosure 320.

In an embodiment of the disclosure, the speaker enclosure 320 may include a first case 330, a second case 340, a second metal plate 350, and a third metal plate 360.

In an embodiment of the disclosure, the first case 330 may support the second speaker unit 310. The first case 330 may be formed in a substantially plate shape. The second speaker unit 310 may be seated on part of the first case 330. For example, the first case 330 may have a first seating recess 331 in which the main body portion 311 of the second speaker unit 310 is disposed and a second seating recess 332 in which the connecting portion 312 of the second speaker unit 310 is disposed.

In an embodiment of the disclosure, the second case 340 may be coupled to the first case 330 to cove at least part of the second speaker unit 310. For example, the second case 340 may be coupled with the first case 330 to form a space in which the second speaker unit 310 is accommodated. The second case 340 may have, in a central portion thereof, a second through-hole 347 through which at least part of the second speaker unit 310 is exposed. For example, at least part of the second speaker unit 310 may overlap the second through-hole 347 and may not be hidden by the second case 340 accordingly. The second case 340 may have, on one side thereof, the sound holes 348 through which a sound generated from the second speaker unit 310 travels outside the speaker enclosure 320.

In an embodiment of the disclosure, the second case 340 may include a sidewall portion 341 that forms a side surface of the second case 340, an extending portion 342 that extends from the inside surface of the sidewall portion 341, and a protruding portion 343 on which the second metal plate 350 is seated.

In an embodiment of the disclosure, the sound holes 348 may be formed through at least part of the sidewall portion 341. The extending portion 342 may extend in a direction perpendicular to the sidewall portion 341 by a predetermined length such that the second through-hole 347 is formed inward of the sidewall portion 341. For example, the second through-hole 347 may be formed adjacent to the sound holes 348.

In an embodiment of the disclosure, the protruding portion 343 may extend along the periphery of the extending portion 342 and/or the periphery of the second through-hole 347. The second metal plate 350 may be disposed on the protruding portion 343. For example, the second metal plate 350 may be attached to the protruding portion 343.

In an embodiment of the disclosure, the protruding portion 343 may protrude to a predetermined height from one surface (e.g., the surface facing the +z-axis direction) of the extending portion 342 such that the second metal plate 350 and the extending portion 342 are spaced apart from each other by a predetermined gap. For example, when the second metal plate 350 is attached to the protruding portion 343, the second metal plate 350 may be spaced apart from the extending portion 342 by the predetermined gap, and thus a predetermined space (e.g., a fourth chamber C4 of FIGS. 12 and 13A) surrounded by the protruding portion 343 may be formed between the second metal plate 350 and the extending portion 342.

In an embodiment of the disclosure, the protruding portion 343 may include a first portion 344 extending along the inside surface of the sidewall portion 341 to form a closed curve and a second portion 345 extending from at least part of the first portion 344 along the periphery of the extending portion 342. A second opening portion 346 may be formed in at least part of the second portion 345. For example, the second opening portion 346 may be formed by cutting away at least a portion from the second portion 345. The speaker assembly 300 may be configured such that the space between the second metal plate 350 and the extending portion 342 is fluidly connected with the second through-hole 347 through the second opening portion 346 in the state in which the second metal plate 350 is attached to the protruding portion 343.

In an embodiment of the disclosure, the second metal plate 350 may be attached to the protruding portion 343 and may be disposed on the second case 340 accordingly. The second metal plate 350 may cover the extending portion 342 and the second through-hole 347. The second metal plate 350 may shield a magnetic force and/or a magnetic field generated from the second speaker unit 310. For example, the second metal plate 350 may include a first surface 351 that forms part of an outer surface of the speaker enclosure 320 and a second surface (e.g., a second surface 352 of FIG. 13A) that faces away from the first surface 351. When the first surface 351 of the second metal plate 350 is viewed from above, the second through-hole 347 and the extending portion 342 may overlap the second metal plate 350. The second surface 352 of the second metal plate 350 may be disposed to face the extending portion 342. A fourth chamber (e.g., the fourth chamber C4 of FIGS. 12 and 13A) partially surrounded by the protruding portion 343 may be formed between part of the second surface 352 of the second metal plate 350 and the extending portion 342.

In an embodiment of the disclosure, the third metal plate 360 may be disposed on the first case 330. For example, the third metal plate 360 may be disposed on the rear surface (e.g., the surface facing the −z-axis direction) of the first case 330. The third metal plate 360 may be disposed on a surface facing away from a seating surface 333 on which the main body portion 311 of the second speaker unit 310 is seated. According to various embodiments of the disclosure, the third metal plate 360 may be omitted. Furthermore, according to various embodiments of the disclosure, the first case 330 may be formed in a form in which a portion corresponding to the seating surface 333 is open, such that at least part of the second speaker unit 310 is exposed outside the first case 330.

Figure 12:
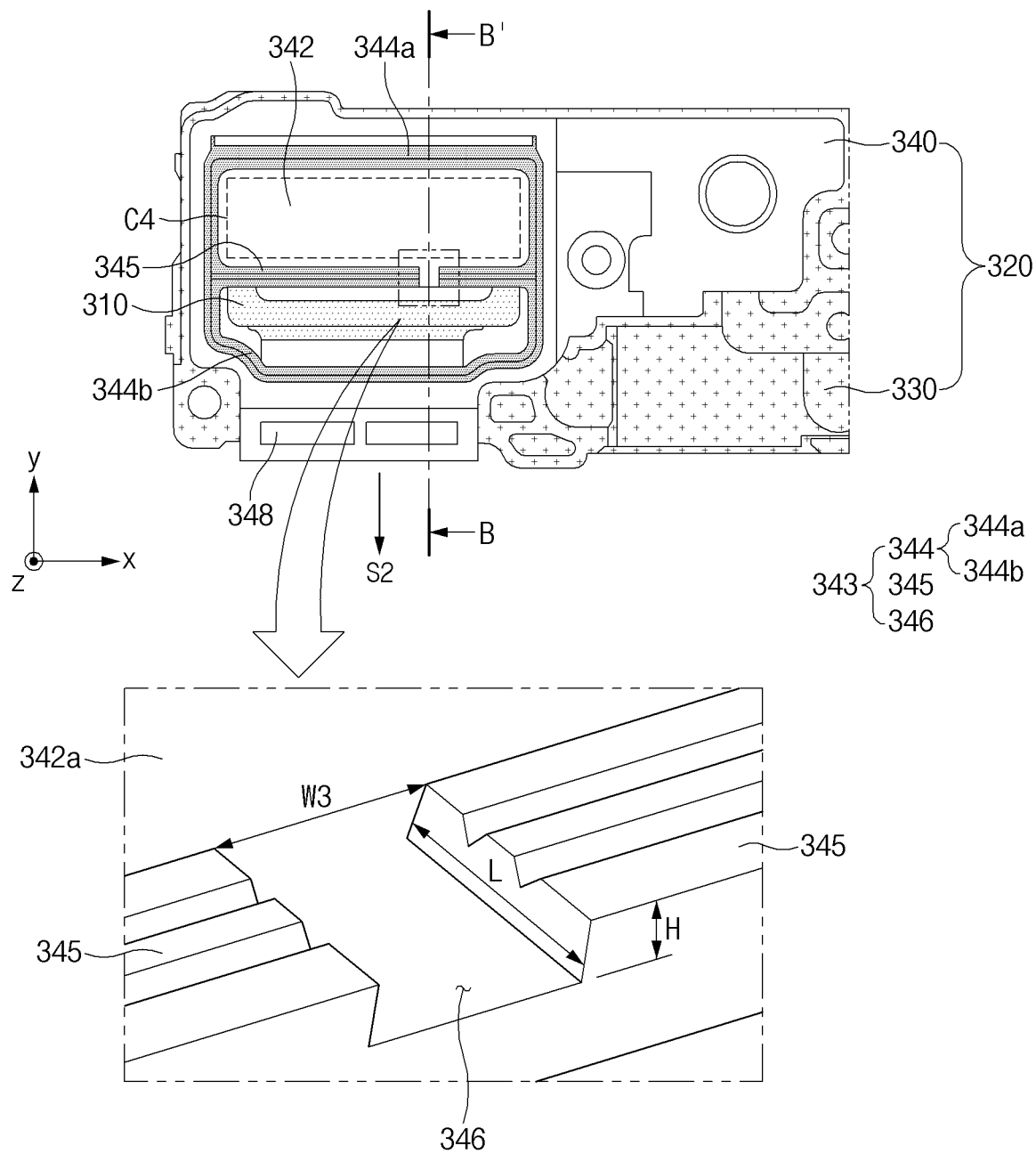
FIG. 12 is a plan view of a speaker assembly of an electronic device according to an embodiment of the disclosure.
Figure 13A:
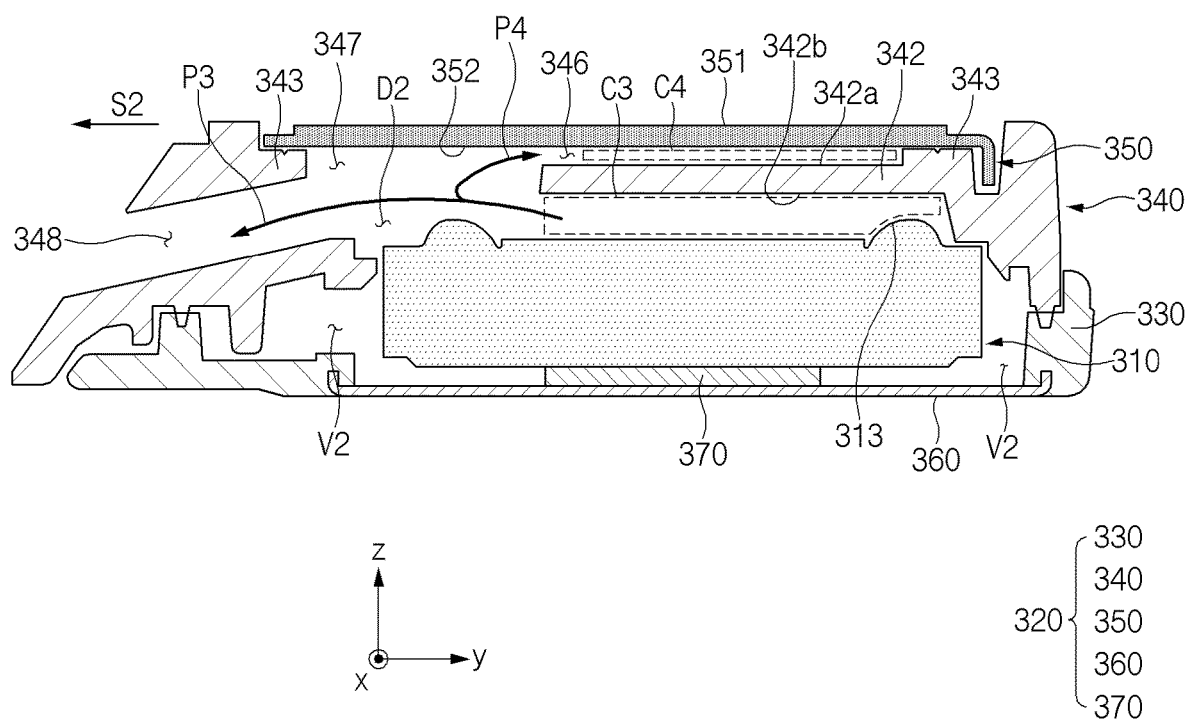
FIG. 13A is a sectional view of a speaker assembly of an electronic device according to an embodiment of the disclosure.

FIG. 12 is a plan view of a speaker assembly of an electronic device according to an embodiment of the disclosure. FIG. 13A is a sectional view of a speaker assembly of an electronic device according to an embodiment of the disclosure.

FIG. 12 is a view of the speaker assembly as viewed from above the second case. FIG. 13A is a sectional view of the speaker assembly taken along line B-B' in FIG. 12.

Referring to FIGS. 12 and 13A, the speaker assembly 300 of the electronic device (e.g., the electronic device 200 of FIG. 3) according to the embodiment may include the second speaker unit 310 and the speaker enclosure 320. In an embodiment of the disclosure, the speaker enclosure 320 may include the first case 330, the second case 340, the second metal plate 350, the third metal plate 360, and a cushion member 370.

FIG. 12 may be a view in which the second metal plate 350 of the speaker assembly 300 is omitted. Some of the components of the speaker assembly 300 illustrated in FIGS. 12 and 13A may be identical or similar to some of the components of the speaker assembly 300 illustrated in FIGS. 9 to 11. Hereinafter, repetitive descriptions will be omitted.

In an embodiment of the disclosure, the second speaker unit 310 may be accommodated in the space between the first case 330 and the second case 340. Part of the second speaker unit 310 may be disposed to face the extending portion 342 of the second case 340. A sound generated from the second speaker unit 310 may travel outside the speaker enclosure 320 through the sound holes 348 formed in the second case 340. As the sound holes 348 are formed in the side surface of the second case 340, the sound generated from the second speaker unit 310 may be output from the speaker enclosure 320 in a lateral direction (e.g., the −y-axis direction or a second direction S2).

In an embodiment of the disclosure, a second duct D2 fluidly connected with the sound holes 348 may be formed in the speaker enclosure 320. The second duct D2 may refer to the space between the second metal plate 350 and the second speaker unit 310 that is formed by the second through-hole 347 of the second case 340. According to various embodiments of the disclosure, a sound generated from the second speaker unit 310 may travel outside the speaker enclosure 320 through the second duct D2 and the sound holes 348.

In an embodiment of the disclosure, a third chamber C3 (e.g., a first separation space) may be formed between the second speaker unit 310 and the extending portion 342. With respect to the second speaker unit 310, the third chamber C3 may be located in the direction that the vibration plate 313 of the second speaker unit 310 faces. The third chamber C3 may be fluidly connected with the second duct D2. For example, the third chamber C3 may be construed as a front volume of the second speaker unit 310. According to the illustrated embodiment of the disclosure, the extending portion 342 and the second through-hole 347 of the second case 340 may maintain the second duct D2 between the second metal plate 350 and the second speaker unit 310 at a predetermined interval or more and may reduce the gap of the third chamber C3 (e.g., the front volume), thereby improving the sound quality and/or acoustic performance of the second speaker unit 310.

In an embodiment of the disclosure, the fourth chamber C4 (e.g., a second separation space) surrounded by the protruding portion 343 may be formed between the extending portion 342 and the second metal plate 350. For example, the second metal plate 350 may include the first surface 351 that forms the exterior of the speaker enclosure 320 and the second surface 352 that faces away from the first surface 351. The extending portion 342 may include a first surface 342a that faces the second surface 352 of the second metal plate 350 and a second surface 342b that faces away from the first surface 342a.

According to an embodiment of the disclosure, the third chamber C3 may be formed between the second speaker unit 310 and the second surface 342b of the extending portion 342, and the fourth chamber C4 may be formed between the second surface 352 of the second metal plate 350 and the first surface 342a of the extending portion 342. The third chamber C3 and the fourth chamber C4 may be connected such that a sound generated from the second speaker unit 310 travels between the third chamber C3 and the fourth chamber C4.

In an embodiment of the disclosure, the protruding portion 343 may protrude to a predetermined height from the first surface 342a of the extending portion 342. When the second metal plate 350 is attached to the protruding portion 343, the second surface 352 of the second metal plate 350 may be spaced apart from the first surface 342a of the extending portion 342 by a predetermined gap. For example, the fourth chamber C4 may refer to a predetermined space formed by part of the second surface 352 of the second metal plate 350, the first surface 342a of the extending portion 342, and the protruding portion 343.

In an embodiment of the disclosure, the second opening portion 346 may be formed in at least part of the protruding portion 343. The fourth chamber C4 may be fluidly connected with the third chamber C3 and/or the second duct D2 by the second opening portion 346. For example, the second opening portion 346 may be formed to correspond to the direction (e.g., the second direction S2) in which the second duct D2 extends from the third chamber C3. The second opening portion 346 may be formed to be connected with the second through-hole 347. For example, the protruding portion 343 may include the first portion 344 that forms a closed curve and the second portion 345 extending from the first portion 344 along an end portion of the extending portion 342. Based on FIG. 12, the second portion 345 may be located at the border between the extending portion 342 and the second through-hole 347, and the second opening portion 346 may be formed in part of the second portion 345.

In an embodiment of the disclosure, the second opening portion 346 may be formed to correspond to a direction in which a sound is radiated. Part of the protruding portion 343 may be opened (or, cut away) toward the sound holes 348 to form the second opening portion 346. For example, a sound generated from the second speaker unit 310 may travel in substantially the second direction S2 and may be radiated outside the speaker assembly 300. The second opening portion 346 may be open in the second direction S2 such that at least part of a sound travelling in the second direction S2 from the third chamber C3 toward the second duct D2 (or, the sound holes 348) travels into the fourth chamber C4 in the opposite direction to the second direction S2. For example, the sound holes 348 may extend from part of the second duct D2 in the second direction S2, and the second opening portion 346 may extend part of the second duct D2 in the opposite direction to the second direction S2.

In an embodiment of the disclosure, the first portion 344 of the protruding portion 343 may be formed in a shape surrounding the periphery of the extending portion 342 and the periphery of the second through-hole 347. For example, the first portion 344 may include a first peripheral portion 344a surrounding the periphery of the extending portion 342 together with the second portion 345 and a second peripheral portion 344b extending to surround the periphery of the second through-hole 347. The first peripheral portion 344a and the second peripheral portion 344b may be distinguished from each other with respect to the second portion 345.

In an embodiment of the disclosure, the first peripheral portion 344a and the second portion 345 of the protruding portion 343 may extend from the periphery of the first surface 342a of the extending portion 342 in a direction (e.g., the +z-axis direction) perpendicular to the first surface 342a of the extending portion 342. For example, the first peripheral portion 344a and the second portion 345 may surround the space between the second surface 352 of the second metal plate 350 and the first surface 342a of the extending portion 342 to form the fourth chamber C4.

In an embodiment of the disclosure, the protruding portion 343 may be formed such that the first portion 344 and the second portion 345 have substantially the same width. However, without being limited thereto, the first portion 344 and the second portion 345 may have different widths. Furthermore, the first portion 344 may be formed such that the widths of the first peripheral portion 344a and the second peripheral portion 344b are substantially the same as or different from each other. According to various embodiments of the disclosure, the size of the fourth chamber C4 may be changed by changing the widths of the first peripheral portion 344a and the second portion 345.

In an embodiment of the disclosure, the fourth chamber C4 other than the second opening portion 346 may be sealed from other spaces in the speaker enclosure 320. For example, the fourth chamber C4 may be fluidly connected with a space outside the fourth chamber C4 through only the second opening portion 346.

In an embodiment of the disclosure, travel paths of a sound generated from the second speaker unit 310 may include at least one third travel path P3 traveling along the third chamber C3 and the second duct D2 and at least one fourth travel path P4 substantially facing away from the at least one third travel path P3 and traveling into the fourth chamber C4 through the second opening portion 346. The second opening portion 346 may overlap the at least one third travel path P3 when the first surface 342a of the extending portion 342 is viewed from above.

In an embodiment of the disclosure, the size of the fourth chamber C4 may be changed depending on the height and/or width of the protruding portion 343. For example, the size of the fourth chamber C4 may be increased as the height H of the protruding portion 343 is increased. In contrast, the size of the fourth chamber C4 may be decreased as the height H of the protruding portion 343 is decreased. Furthermore, as the width of the protruding portion 343 (e.g., the first peripheral portion 344a or the second portion 345) is increased, the area of a region of the first surface 342a of the extending portion 342 that is located inside the protruding portion 343 may be decreased, and thus the size of the fourth chamber C4 may be decreased. In contrast, as the width of the protruding portion 343 is decreased, the area of a region of the first surface 342a of the extending portion 342 that is located inside the protruding portion 343 may be increased, and thus the size of the fourth chamber C4 may be increased.

In an embodiment of the disclosure, the cushion member 370 may be disposed between the second speaker unit 310 and the third metal plate 360. The cushion member 370 may buffer vibration of the second speaker unit 310 and may prevent the vibration of the second speaker unit 310 from being delivered to the third metal plate 360. For example, the cushion member 370 may be disposed on one surface of the third metal plate 360, and the second speaker unit 310 may be disposed on the cushion member 370 to face the third metal plate 360. The cushion member 370 may contain a material having ductility so as to be compressed between the second speaker unit 310 and the third metal plate 360. For example, the cushion member 370 may include at least one of poron, sponge, rubber, and silicone. In an embodiment of the disclosure, the cushion member 370 may be formed to have a predetermined thickness, and the second speaker unit 310 may be supported by the cushion member 370 and may be spaced apart from the third metal plate 360 by a predetermined gap accordingly.

In an embodiment of the disclosure, a back volume V2 may be formed in the speaker enclosure 320. The back volume V2 may be defined as a predetermined space formed by the first case 330, part of the second case 340, and the third metal plate 360 that surround the second speaker unit 310. For example, the back volume V2 may be a space in the speaker enclosure 320 that is located in a lower direction (e.g., the −z-axis direction) with respect to the vibration plate 313 of the second speaker unit 310. As the back volume V2 is formed in the speaker enclosure 320, the speaker assembly 300 may ensure a space for oscillation of a sound generated from the second speaker unit 310.

According to an embodiment of the disclosure, a second resonator structure of the second speaker unit 310 may be formed in the speaker enclosure 320 by using the second metal plate 350 and the protruding portion 343. The second resonator structure may be formed by the second opening portion 346 and the fourth chamber C4. The second opening portion 346 may form a resonator neck of the second resonator structure, and the fourth chamber C4 may form a resonator volume of the second resonator structure.

Referring to FIG. 13A, a sound generated from the second speaker unit 310 may be radiated in a lateral direction (e.g., the second direction S2). For example, a sound generated from the vibration plate 313 of the second speaker unit 310 may travel along the second duct D2 extending in a direction (e.g., the y-axis direction) substantially perpendicular to the direction (e.g., the +z-axis direction) that the vibration plate 313 faces. According to an embodiment of the disclosure, the speaker assembly 300, which includes the second resonator structure formed by the second opening portion 346 and the fourth chamber C4, may prevent a phenomenon in which due to resonance caused by the second duct D2 and the third chamber C3, a sound at a specific frequency (e.g., a resonance frequency) is amplified and a bandwidth is narrowed.

In an embodiment of the disclosure, the second opening portion 346 and the fourth chamber C4 may extend from the second duct D2 and may be formed in a side branch structure. Accordingly, the second resonator structure may operate as a band rejection filter (e.g., a side branch acoustic absorber).

According to an embodiment of the disclosure, a sound generated from the second speaker unit 310 may enter and exit the fourth chamber C4 through the second opening portion 346, and thus a resonant action may be performed. As the resonant action is performed, sound absorption may occur at a specific frequency, which may lead to a decrease in output at the specific frequency and an increase in output in a frequency band around the specific frequency. According to various embodiments of the disclosure, a resonator (or, a side branch acoustic absorber) having desired characteristics may be designed by adjusting the volume of the fourth chamber C4 and the length L and/or the width W3 of the second opening portion 346.

As the protruding portion 343 is formed in a form in which a portion thereof is open, the speaker assembly 300 according to the embodiment may implement a resonance structure of the second speaker unit 310 using the second metal plate 350 and the protruding portion 343. According to this, the resonator neck and the resonator volume may be changed by adjusting the shape and/or size of the protruding portion 343, and thus the design and tuning of the resonator may be easily performed. Furthermore, as the resonance structure is designed by using the second case 340 and a shielding member (e.g., the second metal plate 350) of the speaker enclosure 320, a mechanical design change of the speaker assembly 300 and an additional part are unnecessary, and the resonance structure may be applicable to various speaker systems.

Figure 13B:
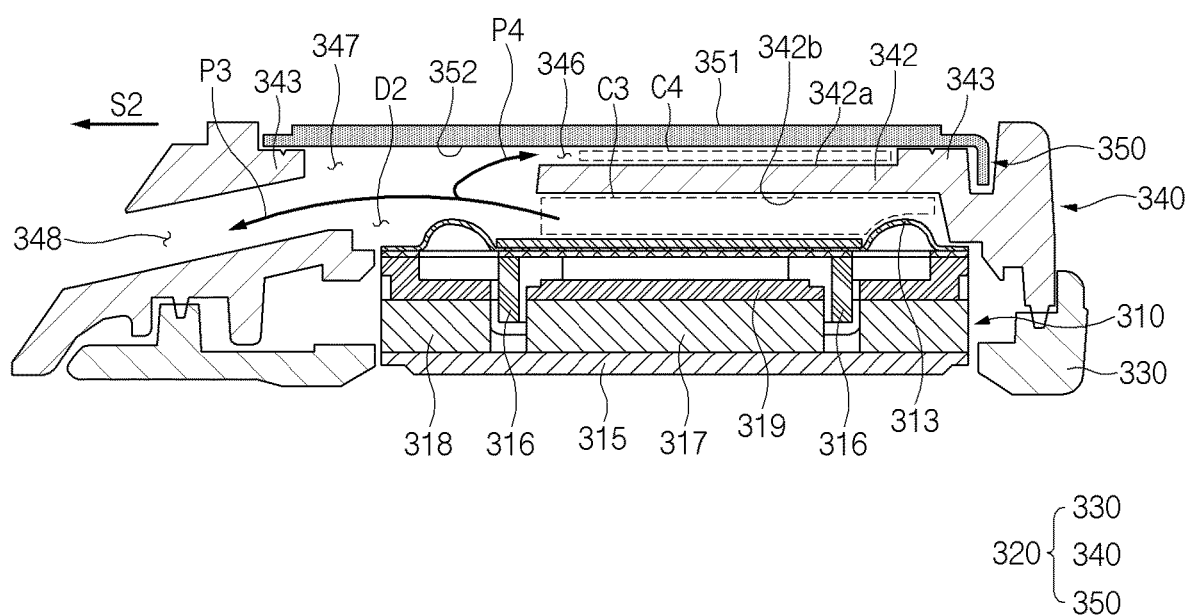
FIG. 13B is a sectional view of a speaker assembly of an electronic device according to an embodiment of the disclosure.

FIG. 13B is a sectional view of a speaker assembly of an electronic device according to an embodiment of the disclosure.

Referring to FIG. 13B, the speaker assembly 300' of the electronic device (e.g., the electronic device 200 of FIG. 3) according to the embodiment may include a second speaker unit 310 and a speaker enclosure 320.

Some of the components of the speaker assembly 300' illustrated in FIG. 13B may be identical or similar to some of the components of the speaker assembly 300 illustrated in FIG. 13A. Hereinafter, repetitive descriptions will be omitted.

Unlike the speaker enclosure 320 of the speaker assembly 300 according to the embodiment of FIG. 13A, the speaker enclosure 320 of the speaker assembly 300' according to the embodiment of FIG. 13B may not include a third metal plate (e.g., the metal plate 360 of FIG. 13A) and a cushion member (e.g., the cushion member 370 of FIG. 13A).

In an embodiment of the disclosure, the speaker enclosure 320 may include a first case 330, a second case 340, and a second metal plate 350.

In an embodiment of the disclosure, the speaker enclosure 320 may be formed in a form in which one surface is open, such that at least part of the second speaker unit 310 is exposed outside the speaker enclosure 320. For example, an opening area (not illustrated) may be formed in the first case 330, and the second speaker unit 310 may be exposed outside the first case 330 through the opening area. According to an embodiment of the disclosure, a yoke 315 of the second speaker unit 310 may be exposed outside the speaker enclosure 320 through the opening area.

In an embodiment of the disclosure, the second speaker unit 310 may include a vibration plate 313, the yoke 315, a voice coil 316, magnets 317 and 318, and a plate 319. According to various embodiments of the disclosure, the second speaker unit 310 may not include at least one of the illustrated components, or may further include other component(s).

In an embodiment of the disclosure, the second speaker unit 310 may be formed in a structure in which the first magnet 317 and the second magnet 318 are disposed on one surface of the yoke 315 and the plate 319 is disposed to face the yoke 315 with the magnets 317 and 318 therebetween.

The voice coil 316 may be disposed in the separation space between the first magnet 317 and the second magnet 318. For example, the voice coil 316 may oscillate in an up/down direction (e.g., the z-axis direction) as an electrical signal (e.g., an audio signal in the form of a sine wave) is applied thereto.

In an embodiment of the disclosure, the vibration plate 313 may be disposed on the plate 319 to face an extending portion 342. Part of the vibration plate 313 may be supported by the plate 319, and another part of the vibration plate 313 may be spaced apart from the plate 319 by a predetermined gap. For example, the voice coil 316, the magnets 317 and 318, and the plate 319 of the speaker unit 310 may be disposed between the yoke 315 and the vibration plate 313. In an embodiment of the disclosure, the vibration plate 313 may generate a sound while oscillating together with the voice coil 316 by oscillation of the voice coil 316. According to various embodiments of the disclosure, the vibration plate 313 may include a center vibration plate (not illustrated) and a side vibration plate (not illustrated). For example, the vibration plate 313 may contain plastic, metal, fiber, or wood.

According to various embodiments of the disclosure, the structure of the second speaker unit 310 illustrated in FIG. 13B may be identically applied to a first speaker unit (e.g., the first speaker unit 250 of FIG. 8). In various embodiments of the disclosure, the first speaker unit 250 may further include a protector (e.g., a speaker grill, a speaker mesh, or a cover), in addition to the components (e.g., the vibration plate 313, the yoke 315, the voice coil 316, the magnets 317 and 318, and the plate 319) illustrated in FIG. 13B.

Figure 14:
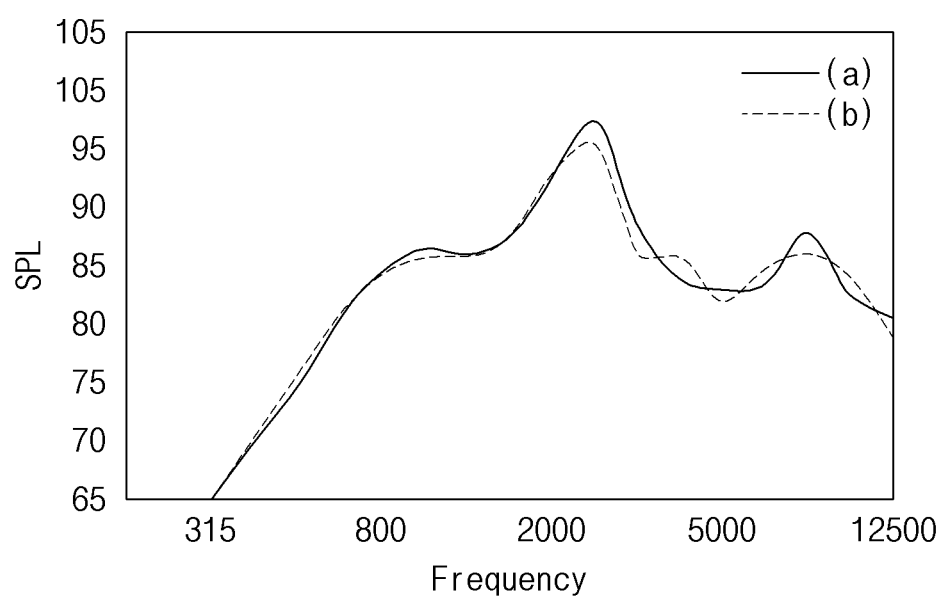
FIG. 14 is a graph depicting performance of a speaker unit of an electronic device according to an embodiment of the disclosure.
Figure 15:
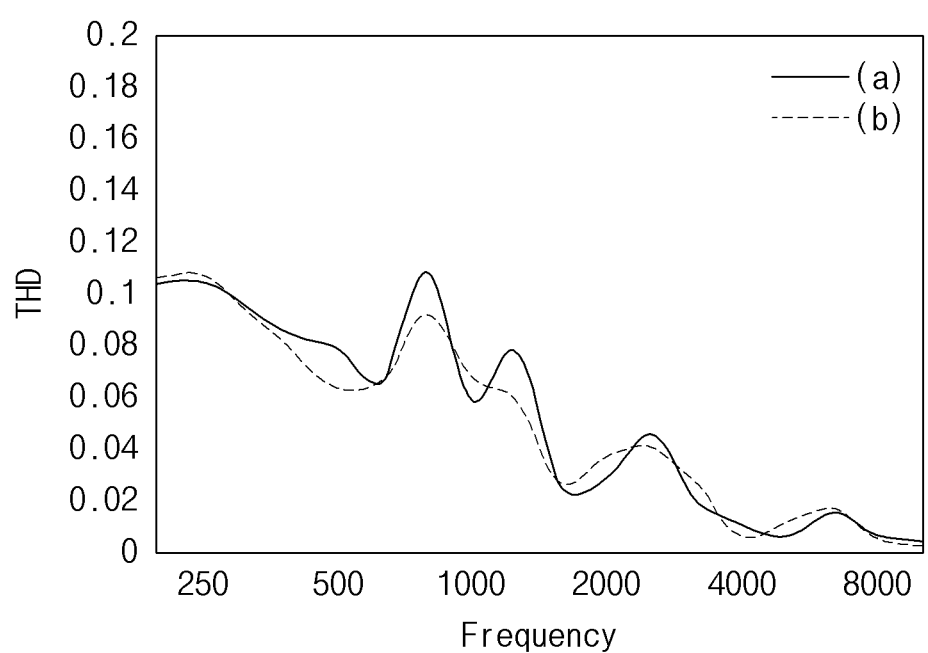
FIG. 15 is a graph depicting performance of a speaker unit of an electronic device according to an embodiment of the disclosure.

FIG. 14 is a graph depicting acoustic performance of a speaker unit of an electronic device according to an embodiment of the disclosure. FIG. 15 is a graph depicting acoustic performance of a speaker unit of an electronic device according to an embodiment of the disclosure.

FIG. 14 is a graph depicting measurement results on the sound pressure of the speaker unit according to an embodiment. FIG. 15 is a graph depicting measurement results on the total harmonic distortion (THD) of the speaker unit according to an embodiment.

For example, the total harmonic distortion (THD) means the ratio of the sum of the levels of harmonic components included in an output signal when a sinusoidal wave of a single frequency is input to the level of the output signal. It may mean that the lower the total harmonic distortion (THD), the better the speaker's performance.

The graphs of FIGS. 14 and 15 may be graphs depicting a difference in acoustic performance of the first speaker unit 250 depending on whether a resonator structure is formed in the support structure of the first speaker unit (e.g., the first speaker unit 250 of FIGS. 5 to 8) of the electronic device 200 illustrated in FIGS. 4 to 8.

Referring to FIGS. 14 and 15, the electronic device 200 according to the embodiment may include the resonator structure of the first speaker unit 250 formed by the first opening portion (e.g., the first opening portion 275 of FIGS. 7 and 8) and the second chamber (e.g., the second chamber C2 of FIG. 8), thereby having an effect that the acoustic performance of the first speaker unit 250 is improved.

In FIGS. 14 and 15, embodiment (a) may be an embodiment in which the resonator structure of the first speaker unit 250 is not formed in the electronic device 200. Embodiment (b) may be an embodiment (e.g., FIGS. 4 to 8) in which the resonator structure of the first speaker unit 250 is formed as described above with reference to FIGS. 4 to 8. For example, embodiment (a) may mean an embodiment in which the support structure of the first speaker unit 250 of the electronic device 200 illustrated in FIGS. 4 to 8, the first opening portion 275 is not formed in the sealing member (e.g., the sealing member 270 of FIGS. 6 to 8), or the sealing member 270 is formed in a form in which the central portion thereof is not empty, but is filled, so that the resonator structure of the first speaker unit 250 is not formed.

Referring to FIG. 14, it can be seen that the sound pressure (e.g., output or volume) at the resonance frequency in embodiment (b) corresponding to the disclosure is lower than that in embodiment (a). Furthermore, it can be seen that the degree to which the output is decreased in the frequency range after the resonance frequency in embodiment (b) is lower than that in embodiment (a). Accordingly, it can be seen that the sound pressures in the frequency bands on both sides of the resonance frequency in embodiment (b) are higher than those in embodiment (a) and the bandwidth in embodiment (b) is wider than that in embodiment (a).

Referring to FIG. 15, it can be seen that the total harmonic distortion (THD) in embodiment (b) corresponding to the disclosure is lower on the whole than that in embodiment (a). This may mean that the levels of harmonic components included in a signal output from the speaker according to embodiment (b) are low so that the total harmonic distortion (THD) is improved.

Figure 16:
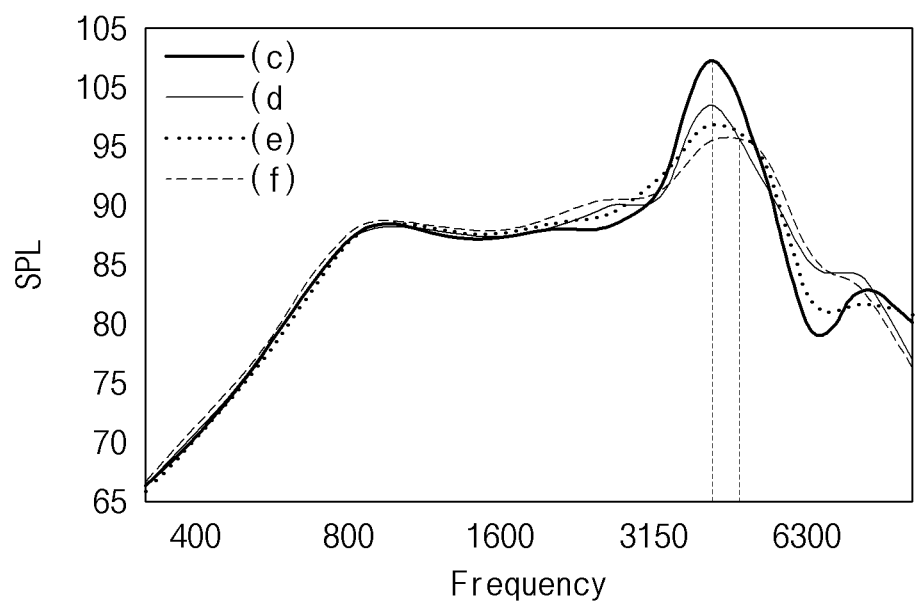
FIG. 16 is a graph depicting performance of a speaker unit of an electronic device according to an embodiment of the disclosure.
Figure 17:
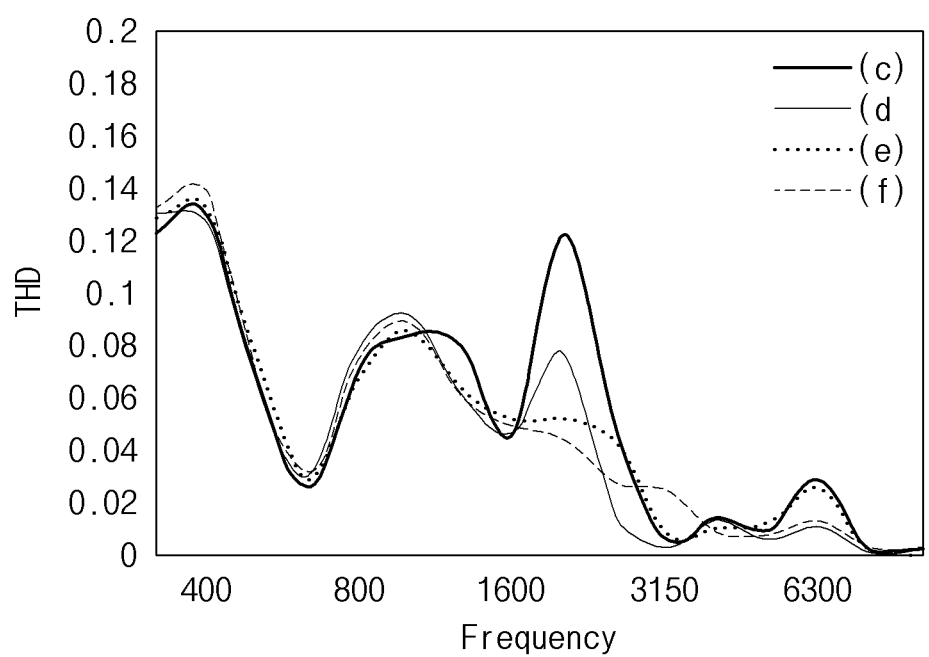
FIG. 17 is a graph depicting performance of a speaker unit of an electronic device according to an embodiment of the disclosure.

FIG. 16 is a graph depicting performance of a speaker unit of an electronic device according to an embodiment of the disclosure. FIG. 17 is a graph depicting performance of a speaker unit of an electronic device according to an embodiment of the disclosure.

FIG. 16 is a graph depicting measurement results on the sound pressure of the speaker unit according to an embodiment. FIG. 17 is a graph depicting measurement results on the total harmonic distortion (THD) of the speaker unit according to an embodiment.

The graphs of FIGS. 16 and 17 may be graphs depicting a difference in acoustic performance of the second speaker unit (e.g., the second speaker unit 310 of FIGS. 10 to 13B) depending on the size of the resonator volume (e.g., the fourth chamber C4 of FIGS. 12 to 13B) in the speaker assembly illustrated in FIGS. 9 to 13B (e.g., the speaker assembly 300 of FIGS. 9 to 13A or the speaker assembly 300' of FIG. 13B).

Referring to FIGS. 16 and 17, the speaker assembly 300 according to the embodiment may include the resonator structure of the second speaker unit 310 formed by the second opening portion (e.g., the second opening portion 346 of FIGS. 11 to 13B) and the fourth chamber (e.g., the fourth chamber C4 of FIGS. 12 to 13B), thereby having an effect that the acoustic performance of the second speaker unit 310 is improved.

In FIGS. 16 and 17, embodiment (c) may be an embodiment in which the resonator structure is not formed in the speaker assembly 300. Embodiment (d) may be an embodiment in which the fourth chamber C4 has a first volume. Embodiment (e) may be an embodiment in which the fourth chamber C4 has a second volume greater than the first volume. Embodiment (f) may be an embodiment in which the fourth chamber C4 has a third volume greater than the second volume. For example, embodiment (c) may mean an embodiment in which the speaker assemblies 300 and 300' illustrated in FIGS. 9 to 13B, the second opening portion 346 is not formed in the protruding portion (e.g., the protruding portion 343 of FIGS. 11 to 13B), or the protruding portion 343 is formed in a form in which the central portion thereof is not empty, but is filled, so that the resonator structure of the second speaker unit 310 is not formed.

Referring to FIG. 16, it can be seen that the resonance frequencies in embodiments (d), (e), and (f) corresponding to the disclosure are higher than that in embodiment (c) and the sound pressures (e.g., outputs or volumes) at the resonance frequencies in embodiments (d), (e), and (f) are lower than that in embodiment (c). Furthermore, it can be seen that the sound pressures in the frequency bands on both sides of the resonance frequencies in embodiments (d), (e), and (f) are higher than those in embodiment (c) and the bandwidths in embodiments (d), (e), and (f) are wider than that in embodiment (c).

As shown in the graph of FIG. 16, when embodiments (d), (e), and (f) in which the sizes of the fourth chambers C4 forming the resonator volumes differ from one another are compared, it can be seen that as the size of the resonator volume (e.g., the fourth chamber C4) is increased, the resonance frequency is increased, the sound pressure at the resonance frequency is decreased, and the bandwidth is increased.

Referring to FIG. 17, it can be seen that the total harmonic distortions (THDs) in embodiments (d), (e), and (f) corresponding to the disclosure are lower on the whole than that in embodiment (c). This may mean that the levels of harmonic components included in a signal output from the speaker according to embodiment (b) are low so that the total harmonic distortion (THD) is improved.

As shown in the graph of FIG. 17, when embodiments (d), (e), and (f) in which the sizes of the fourth chambers C4 forming the resonator volumes differ from one another are compared, it can be seen that the larger the resonator volume (e.g., the fourth chamber C4), the greater the improvement effect of the total harmonic distortion (THD).

FIG. 18 is a block diagram of an electronic device in a network environment according to an embodiment of the disclosure.

Referring to FIG. 18, the electronic device 401 in the network environment 400 may communicate with an electronic device 402 via a first network 498 (e.g., a short-range wireless communication network), or at least one of an electronic device 404 or a server 408 via a second network 499 (e.g., a long-range wireless communication network). According to an embodiment of the disclosure, the electronic device 401 may communicate with the electronic device 404 via the server 408.

According to an embodiment of the disclosure, the electronic device 401 may include a processor 420, memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In some embodiments of the disclosure, at least one of the components (e.g., the connecting terminal 478) may be omitted from the electronic device 401, or one or more other components may be added in the electronic device 401. In some embodiments of the disclosure, some of the components (e.g., the sensor module 476, the camera module 480, or the antenna module 497) may be implemented as a single component (e.g., the display module 460).

The processor 420 may execute, for example, software (e.g., a program 440) to control at least one other component (e.g., a hardware or software component) of the electronic device 401 coupled with the processor 420, and may perform various data processing or computation. According to one embodiment of the disclosure, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to an embodiment of the disclosure, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 421. For example, when the electronic device 401 includes the main processor 421 and the auxiliary processor 423, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment of the disclosure, the auxiliary processor 423 (e.g., an image signal processor or a communication processor) may be implemented as part of another component (e.g., the camera module 480 or the communication module 490) functionally related to the auxiliary processor 423. According to an embodiment of the disclosure, the auxiliary processor 423 (e.g., the neural processing unit) may include a hardware structure specified for artificial intelligence model processing. An artificial intelligence model may be generated by machine learning. Such learning may be performed, e.g., by the electronic device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by another component (e.g., the processor 420) of the electronic device 401, from the outside (e.g., a user) of the electronic device 401. The input module 450 may include, for example, a microphone, a mouse, a keyboard, a key (e.g., a button), or a digital pen (e.g., a stylus pen).

The sound output module 455 may output sound signals to the outside of the electronic device 401. The sound output module 455 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 460 may visually provide information to the outside (e.g., a user) of the electronic device 401. The display module 460 may include, for example, a display, a hologram device, or a projector and control circuitry to control a corresponding one of the display, hologram device, and projector. According to an embodiment of the disclosure, the display module 460 may include a touch sensor adapted to detect a touch, or a pressure sensor adapted to measure the intensity of force incurred by the touch.

The audio module 470 may convert a sound into an electrical signal and vice versa. According to an embodiment of the disclosure, the audio module 470 may obtain the sound via the input module 450, or output the sound via the sound output module 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment of the disclosure, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment of the disclosure, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment of the disclosure, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 479 may include, for example, a motor, a piezoelectric element, or an electric stimulator.

The camera module 480 may capture a still image or moving images. According to an embodiment of the disclosure, the camera module 480 may include one or more lenses, image sensors, image signal processors, or flashes.

The power management module 488 may manage power supplied to the electronic device 401. According to one embodiment of the disclosure, the power management module 488 may be implemented as at least part of, for example, a power management integrated circuit (PMIC).

The battery 489 may supply power to at least one component of the electronic device 401. According to an embodiment of the disclosure, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment of the disclosure, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 401, an external electronic device (e.g., the electronic device 404), or a network system (e.g., the second network 499). According to an embodiment of the disclosure, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 497 may transmit or receive a signal or power to or from the outside (e.g., the external electronic device) of the electronic device 401. According to an embodiment of the disclosure, the antenna module 497 may include an antenna including a radiating element composed of a conductive material or a conductive pattern formed in or on a substrate (e.g., a printed circuit board (PCB)). According to an embodiment of the disclosure, the antenna module 497 may include a plurality of antennas (e.g., array antennas). In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment of the disclosure, another component (e.g., a radio frequency integrated circuit (RFIC)) other than the radiating element may be additionally formed as part of the antenna module 497.

According to various embodiments of the disclosure, the antenna module 497 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 401 and the external electronic device 404 via the server 408 coupled with the second network 499. Each of the electronic devices 402 or 404 may be a device of a same type as, or a different type, from the electronic device 401. According to an embodiment of the disclosure, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. The electronic device 401 may provide ultra low-latency services using, e.g., distributed computing or mobile edge computing. In another embodiment of the disclosure, the external electronic device 404 may include an internet-of-things (IoT) device. The server 408 may be an intelligent server using machine learning and/or a neural network. According to an embodiment of the disclosure, the external electronic device 404 or the server 408 may be included in the second network 499. The electronic device 401 may be applied to intelligent services (e.g., smart home, smart city, smart car, or healthcare) based on 5G communication technology or IoT-related technology.

An electronic device 200 according to an embodiment of the disclosure may include a front plate 211, a back plate 230 that faces away from the front plate 211, a side member 220 including a frame structure 221 that surrounds an inner space between the front plate 211 and the back plate 230 and a plate structure 222 extending from the frame structure 221 toward the inner space, a display 212 disposed between the plate structure 222 and the front plate 211, a first speaker unit 250 disposed in the inner space, at least part of the first speaker unit 250 being supported by the plate structure 222, a first metal plate 260 disposed between the plate structure 222 and the display 212, and a sealing member 270 that is disposed between the first metal plate 260 and the display 212 and that has a first opening portion 275 formed on a side thereof. A first chamber C1 may be formed between the first speaker unit 250 and the first metal plate 260, and a second chamber C2 surrounded by the sealing member 270 may be formed between the first metal plate 260 and the display 212. The second chamber C2 and the first chamber C1 may be fluidly connected with each other by the first opening portion 275 such that a first resonator structure corresponding to the first speaker unit 250 is formed between the display 212 and the plate structure 222.

In various embodiments of the disclosure, the second chamber C2 other than an area connected with the first opening portion 275 may be sealed from a space outside the second chamber C2 by the sealing member 270.

In various embodiments of the disclosure, the sealing member 270 may be formed in a shape in which a central portion is open to enable formation of the second chamber C2.

In various embodiments of the disclosure, at least part of a sound output from the first speaker unit 250 may travel from the first chamber C1 into the second chamber C2 through the first opening portion 275.

In various embodiments of the disclosure, a first duct D1 extending toward the outside of the electronic device 200 may be formed between the plate structure 222 and the display 212, and the first duct D1 may be fluidly connected with the first chamber C1 and the second chamber C2.

In various embodiments of the disclosure, the first duct D1 may extend from the first chamber C1 in a first direction S1, and the first opening portion 275 may be open in the first direction S1.

In various embodiments of the disclosure, a travel path of a sound generated from the first speaker unit 250 may include a first travel path P1 that travels along the first chamber C1 and the first duct D1 and a second travel path P2 that substantially faces away from the first travel path P1 and travels into the second chamber C2 through the first opening portion 275.

In various embodiments of the disclosure, the first metal plate 260 may be a shielding member that shields a magnetic field or a magnetic force generated from the first speaker unit 250.

In various embodiments of the disclosure, the electronic device may further include a speaker enclosure 320 disposed in the inner space and coupled to the plate structure 222 and a second speaker unit 310 accommodated in the speaker enclosure 320. The speaker enclosure 320 may include a first case 330 that supports the second speaker unit 310, a second case 340 coupled to the first case 330 to cover at least part of the second speaker unit 310, and a second metal plate 350 disposed on the second case 340. A third chamber C3 may be formed between a portion of the second case 340 and the second speaker unit 310, and a fourth chamber C4 may be formed between the portion of the second case 340 and the second metal plate 350. The fourth chamber C4 and the third chamber C3 may be fluidly connected with each other such that a second resonator structure corresponding to the second speaker unit 310 is formed in the speaker enclosure 320.

In various embodiments of the disclosure, the second case 340 may include a sidewall portion 341 having at least one sound hole 348 formed therein, an extending portion 342 extending from the sidewall portion 341 toward a space between the second speaker unit 310 and the second metal plate 350 so as to be perpendicular to the sidewall portion 341, and a protruding portion 343 on which the second metal plate 250 is seated. The protruding portion 343 may partially surround a space between the extending portion 342 and the second metal plate 350 to form the fourth chamber C4. A second opening portion 346 that fluidly connects the fourth chamber C4 and the third chamber C3 may be formed on a side of the protruding portion 343.

In various embodiments of the disclosure, the third chamber C3 may be formed between the second speaker unit 310 and the extending portion 342, and the fourth chamber C4 may be formed between the second metal plate 350 and the extending portion 342.

In various embodiments of the disclosure, the fourth chamber C4 other than an area connected with the second opening portion 346 may be sealed from a space outside the fourth chamber C4 by the protruding portion 343, and part of a sound output from the second speaker unit 310 may travel from the third chamber C3 into the fourth chamber C4 through the second opening portion 346.

In various embodiments of the disclosure, part of the protruding portion 343 may extend to a specified height from one surface of the extending portion 342 toward the second metal plate 350, and the second opening portion 346 may be open in a direction toward the sound hole 348.

In various embodiments of the disclosure, a second duct D2 extending toward the sound hole 348 may be formed in the speaker enclosure 320, and the second duct D2 may be fluidly connected with the third chamber C3 and the fourth chamber C4.

In various embodiments of the disclosure, a travel path of a sound generated from the second speaker unit 310 may include a third travel path P3 that travels along the third chamber C3 and the second duct D2 and a fourth travel path P4 that substantially faces away from the third travel path P3 and travels into the fourth chamber C4 through the second opening portion 346.

In various embodiments of the disclosure, the first opening portion 275 may form a resonator neck of the first resonator structure, and the second chamber C2 may form a resonator volume of the first resonator structure. The second opening portion 346 may form a resonator neck of the second resonator structure, and the fourth chamber C4 may form a resonator volume of the second resonator structure.

A speaker assembly 300 according to an embodiment of the disclosure may include a speaker enclosure 320 having a predetermined receiving space formed therein and a speaker unit 310, at least part of which is accommodated in the receiving space of the speaker enclosure 320. The speaker enclosure 320 may include a first case 330 that supports the speaker unit 310, a second case 340 coupled to the first case 330 to form the receiving space, and a metal plate 350 disposed on the second case 340. The second case 340 may include an extending portion 342 disposed between part of the metal plate 350 and part of the speaker unit 310 and a protruding portion 343 on which the metal plate 350 is seated, the protruding portion 343 having an opening portion 346 formed on a side thereof. A first separation space C3 may be formed between the extending portion 342 and the speaker unit 310, and a second separation space C4 surrounded by part of the protruding portion 343 may be formed between the extending portion 342 and the metal plate 350. The second separation space C4 and the first separation space C3 may be fluidly connected with each other by the opening portion 346 such that a resonator structure corresponding to the speaker unit 310 is formed in the speaker enclosure 320.

In various embodiments of the disclosure, the second separation space C4 other than an area connected with the opening portion 346 may be sealed from a space outside the second separation space C4 by the protruding portion 343, and part of a sound output from the speaker unit 310 may travel from the first separation space C3 into the second separation space C4 through the opening portion 346.

In various embodiments of the disclosure, at least one sound hole 348 may be formed through a side surface of the second case 340, and a duct D2 extending toward the sound hole 348 and fluidly connected with the first separation space C3 and the second separation space C4 may be formed in the speaker enclosure 320.

In various embodiments of the disclosure, the sound hole 348 may extend from the duct D2 in one direction, and the opening portion 346 may extend from the duct D2 in a direction opposite to the one direction.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a front plate;
a back plate configured to face away from the front plate;
a side member including a frame structure configured to surround an inner space between the front plate and the back plate and a plate structure extending from the frame structure toward the inner space;
a display disposed between the plate structure and the front plate;
a first speaker unit disposed in the inner space, at least part of the first speaker unit being supported by the plate structure;
a first metal plate disposed between the plate structure and the display; and
a sealing member disposed between the first metal plate and the display, the sealing member having a first opening portion formed on a side thereof,
wherein a first chamber is formed between the first speaker unit and the first metal plate,
wherein a second chamber surrounded by the sealing member is formed between the first metal plate and the display, and
wherein the second chamber and the first chamber are fluidly connected with each other by the first opening portion such that a first resonator structure corresponding to the first speaker unit is formed between the display and the plate structure.

2. The electronic device of claim 1, wherein the second chamber other than an area connected with the first opening portion is sealed from a space outside the second chamber by the sealing member.

3. The electronic device of claim 1, wherein the sealing member is formed in a shape in which a central portion is open to enable formation of the second chamber.

4. The electronic device of claim 1, wherein at least part of a sound output from the first speaker unit travels from the first chamber into the second chamber through the first opening portion.

5. The electronic device of claim 1,
wherein a first duct extending toward the outside of the electronic device is formed between the plate structure and the display, and
wherein the first duct is fluidly connected with the first chamber and the second chamber.

6. The electronic device of claim 5,
wherein the first duct extends from the first chamber in a first direction, and
wherein the first opening portion is open in the first direction.

7. The electronic device of claim 5, wherein a travel path of a sound generated from the first speaker unit includes:
at least one first travel path configured to travel along the first chamber and the first duct; and
a second travel path configured to face away from the at least one first travel path and travel into the second chamber through the first opening portion.

8. The electronic device of claim 1, wherein the first metal plate is a shielding member configured to shield a magnetic field or a magnetic force generated from the first speaker unit.

9. The electronic device of claim 1, further comprising:
a speaker enclosure disposed in the inner space and coupled to the plate structure; and
a second speaker unit accommodated in the speaker enclosure,
wherein the speaker enclosure includes a first case configured to support the second speaker unit, a second case coupled to the first case to cover at least part of the second speaker unit, and a second metal plate disposed on the second case,
wherein a third chamber is formed between a portion of the second case and the second speaker unit,
wherein a fourth chamber is formed between the portion of the second case and the second metal plate, and
wherein the fourth chamber and the third chamber are fluidly connected with each other such that a second resonator structure corresponding to the second speaker unit is formed in the speaker enclosure.

10. The electronic device of claim 9,
wherein the second case includes a sidewall portion having at least one sound hole formed therein, an extending portion extending from the sidewall portion toward a space between the second speaker unit and the second metal plate so as to be perpendicular to the sidewall portion,
wherein a protruding portion on which the second metal plate is seated,
wherein the protruding portion partially surrounds a space between the extending portion and the second metal plate to form the fourth chamber, and
wherein a second opening portion configured to fluidly connect the fourth chamber and the third chamber is formed on a side of the protruding portion.

11. The electronic device of claim 10,
wherein the third chamber is formed between the second speaker unit and the extending portion, and
wherein the fourth chamber is formed between the second metal plate and the extending portion.

12. The electronic device of claim 10,
wherein the fourth chamber other than an area connected with the second opening portion is sealed from a space outside the fourth chamber by the protruding portion, and
wherein part of a sound output from the second speaker unit travels from the third chamber into the fourth chamber through the second opening portion.

13. The electronic device of claim 10,
wherein part of the protruding portion extends to a specified height from one surface of the extending portion toward the second metal plate, and
wherein the second opening portion is open in a direction toward the sound hole.

14. The electronic device of claim 10,
wherein a second duct extending toward the sound hole is formed in the speaker enclosure, and
wherein the second duct is fluidly connected with the third chamber and the fourth chamber.

15. The electronic device of claim 14, wherein a travel path of a sound generated from the second speaker unit includes:
at least one third travel path configured to travel along the third chamber and the second duct; and
a fourth travel path configured to face away from the at least one third travel path and travel into the fourth chamber through the second opening portion.

16. The electronic device of claim 11,
wherein the first opening portion forms a resonator neck of the first resonator structure,
wherein the second chamber forms a resonator volume of the first resonator structure,
wherein the second opening portion forms a resonator neck of the second resonator structure, and
wherein the fourth chamber forms a resonator volume of the second resonator structure.

17. A speaker assembly comprising:
a speaker enclosure having a predetermined receiving space formed therein; and
a speaker unit, at least part of which is accommodated in the receiving space of the speaker enclosure,
wherein the speaker enclosure includes a first case configured to support the speaker unit, a second case coupled to the first case to form the receiving space, and a metal plate disposed on the second case,
wherein the second case includes an extending portion disposed between part of the metal plate and part of the speaker unit and a protruding portion on which the metal plate is seated, the protruding portion having an opening portion formed on a side thereof,
wherein a first separation space is formed between the extending portion and the speaker unit,
wherein a second separation space surrounded by part of the protruding portion is formed between the extending portion and the metal plate, and
wherein the second separation space and the first separation space are fluidly connected with each other by the opening portion such that a resonator structure corresponding to the speaker unit is formed in the speaker enclosure.

18. The speaker assembly of claim 17,
wherein the second separation space other than an area connected with the opening portion is sealed from a space outside the second separation space by the protruding portion, and
wherein part of a sound output from the speaker unit travels from the first separation space into the second separation space through the opening portion.

19. The speaker assembly of claim 17,
wherein at least one sound hole is formed through a side surface of the second case, and
wherein a duct extending toward the sound hole and fluidly connected with the first separation space is formed in the speaker enclosure.

20. The speaker assembly of claim 19,
wherein the sound hole extends from the duct in one direction, and
wherein the opening portion extends from the duct in a direction opposite to the one direction.

\* \* \* \* \*